United States Patent

Hieda

[11] Patent Number: 5,818,521
[45] Date of Patent: Oct. 6, 1998

[54] IMAGE PICKUP APPARATUS HAVING COMPUTATIONAL GAMMA CORRECTION FACILITY

[75] Inventor: Teruo Hieda, Kanagawa-ken, Japan

[73] Assignee: Canon Kabushiki Kaisha, Tokyo, Japan

[21] Appl. No.: 625,731

[22] Filed: Mar. 29, 1996

Related U.S. Application Data

[62] Division of Ser. No. 174,124, Dec. 23, 1993, abandoned.

[30] Foreign Application Priority Data

Dec. 28, 1992 [JP] Japan ................ 4-360142

[51] Int. Cl.$^6$ ................................ H04N 5/20
[52] U.S. Cl. ............... 348/222; 348/254; 348/674
[58] Field of Search ................... 348/254, 674, 348/675, 676, 678, 679, 222; H04N 5/20, 5/202

[56] References Cited

U.S. PATENT DOCUMENTS

| | | | |
|---|---|---|---|
| 5,089,890 | 2/1992 | Takayama | 348/674 |
| 5,243,426 | 9/1993 | Murayama | 348/674 |
| 5,481,317 | 1/1996 | Hieda | 348/674 |

FOREIGN PATENT DOCUMENTS

| | | | |
|---|---|---|---|
| 1307369 | 12/1989 | Japan | H04N 5/202 |
| 433477 | 2/1992 | Japan | H04N 5/202 |
| 4288781 | 10/1992 | Japan | H04N 5/202 |
| 5191675 | 7/1993 | Japan | H04N 5/202 |
| 5252419 | 9/1993 | Japan | H04N 5/202 |
| 6189160 | 7/1994 | Japan | H04N 5/202 |
| 0457522 | 11/1991 | United Kingdom | H04N 5/202 |
| 2246924 | 2/1992 | United Kingdom | H04N 5/202 |

*Primary Examiner*—Nathan J. Flynn
*Attorney, Agent, or Firm*—Robin, Blecker & Daley

[57] ABSTRACT

There is provided a novel and improved image pickup apparatus which can be reduced in size and low power consumption because of its reduced circuit scale and in which no degradation of image quality occurs at the switching points between a plurality of functions. Such an image pickup apparatus comprises a non-linear circuit for performing non-linear correction of a digitized video signal, and the non-linear circuit includes a multiplier having an input terminal formed by input bits the number of which is $n_1$, $n_1$, being selected to meet a relationship of $n_3 > n_1$, where $n_3$ represents the number of input bits of the non-linear circuit. The non-linear circuit also has predetermined input ranges $R_i$ each of which is selected to be $R_i \leq 2^{n_1} - 1$, and is formed by a combination of characteristics of the respective predetermined input ranges $R_i$.

3 Claims, 21 Drawing Sheets

PEAK LEVEL

F I G. 17(a)
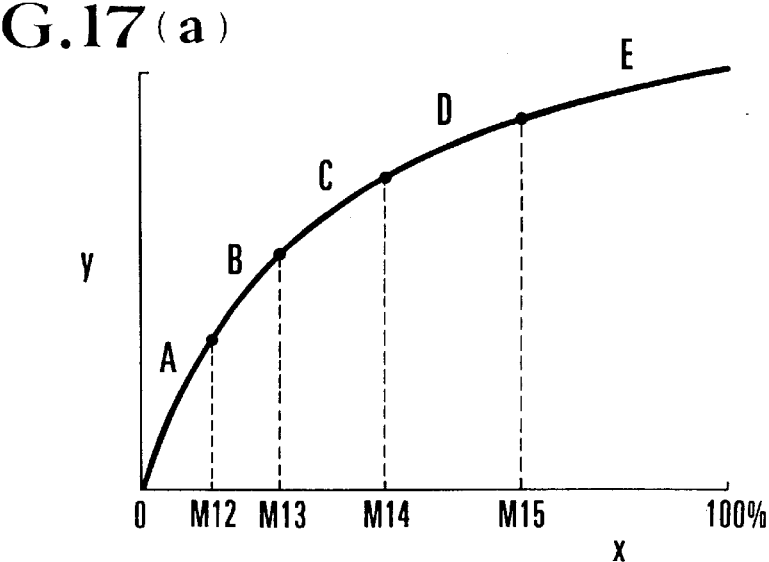
F I G. 17(b)
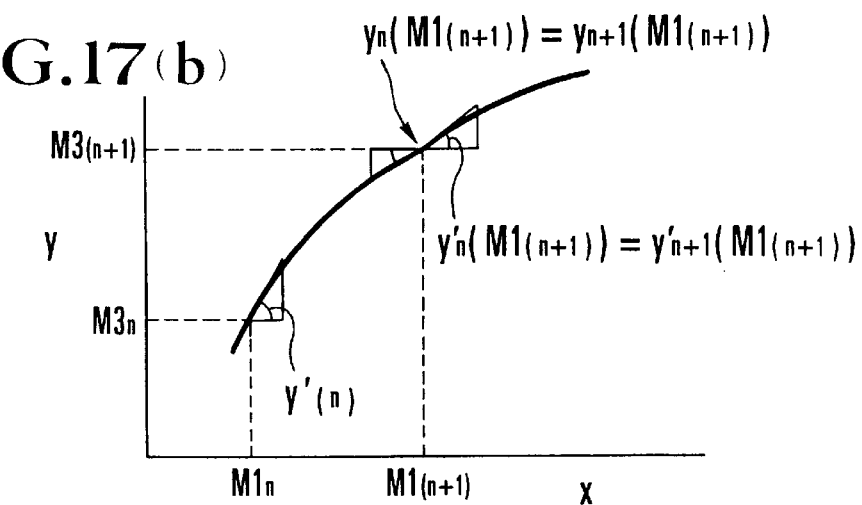
F I G. 17(c)
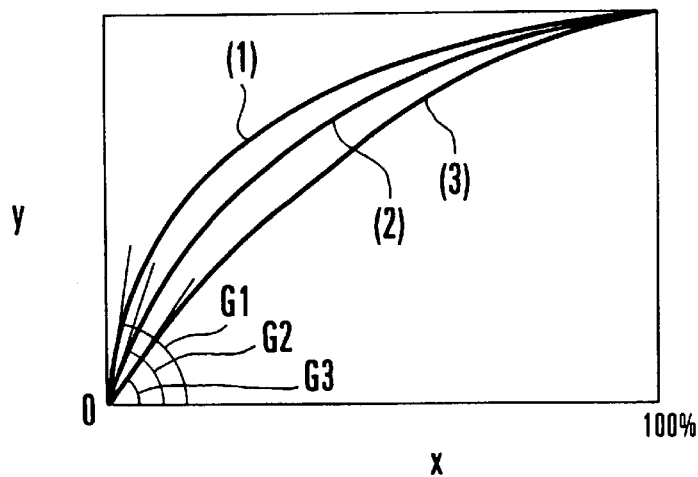

IMAGE PICKUP APPARATUS HAVING COMPUTATIONAL GAMMA CORRECTION FACILITY

This is a divisional application under 37 CFR 1.62 of prior application Ser. No. 08/174,124, filed Dec. 23,1993 now abandoned.

BACKGROUND OF THE INVENTION

1. Field of the Invention

The present invention relates generally to an image pickup apparatus and, more particularly, to an image pickup apparatus capable of varying its gamma correction characteristic by using digital signal processing.

2. Description of the Related Art

With the recent advancement of electronic technology, image pickup apparatus are being reduced in size and weight. In such a situation, with the advancement of semiconductor technology, high-speed analog-to-digital converters (hereinafter referred to as "A/D converter(s)") and high-speed digital-to-analog converters (hereinafter referred to as "D/A converter(s)") have been put into practice. It is also proposed to provide a system for performing digital signal processing of digitized video signals by using an A/D converter and a D/A converter. Such a system is generally arranged to perform A/D conversion of a picked-up image signal, perform signal processing, such as filter processing, color separation, gamma processing, knee processing and matrix processing, by means of digital processing, perform D/A conversion of the digitally processed signal, and output the obtained analog signal.

In another system, an picked-up image signal is converted from analog to digital (A/D), and digital techniques are used to perform processing, such as clipping, gamma correction, filter processing, addition of a sync signal, detection of a sync signal and matrix processing, thereby generating a television digital signal. The television digital signal is converted from digital to analog (D/A) and the analog video signal is outputted. There is yet another system in which a television signal is outputted as a digital video signal.

In such a conventional example, a ROM table is used as a non-linear circuit, such as a gamma correction circuit or a knee circuit. The ROM table utilizes a ROM in which predetermined input-output characteristics are written.

In the image pickup apparatus using the conventionally proposed digital signal processing, a read-only memory (ROM) is employed to form, for example, a gamma circuit. Since the use of this read-only memory involves an increase in the circuit scale of the apparatus, it has been impossible to reduce the cost required to integrate all signal processing circuits into a single integrated circuit.

Also, the power consumption of ROMs is large, and if a ROM is to be formed as part of an integrated circuit, the ROM will need a large chip area. For this reason, it is difficult to form a ROM as a highly integrated circuit, so that it is difficult to realize an image pickup apparatus of small size and light weight.

In addition, there is the problem that an extremely large ROM is needed for widening an input dynamic range or realizing a finer characteristic curve.

As is known, it is occasionally necessary to finely adjust a non-linear characteristic curve in accordance with the kind or conditions of a subject to be photographed. For example, if a subject is to be photographed under low S/N conditions when it is dark, it is desirable to make the non-linear characteristic closer to a straight line since an increase in noise in a dark portion can be suppressed. If a subject of high contrast is to be photographed, for example, outdoors, it is desirable to decrease, particularly, the inclination of a high-luminance portion of the non-linear characteristic since it is possible to reduce a gradational deterioration due to the saturation of the high-luminance portion.

However, in the conventional systems, since an extremely large ROM is needed, it has been substantially impossible to realize such a fine adjustment.

Further, in the image pickup apparatus employing the conventionally proposed digital signal processing, since a circuit conventionally used in analog systems is merely replaced with a circuit for digital systems, the circuit scale is large and a large current consumption occurs. This large circuit scale makes it impossible to integrate all signal processing circuits into a single integrated circuit or to reduce the required cost. Particularly in a conventional type of non-linear circuit, such as a gamma correction circuit, since an arrangement using a ROM is adopted, an extremely large circuit scale is needed.

The above-described types of image pickup apparatus have a further problem. If an analog system is replaced with a digital system having a variable characteristic, the circuit scale will increase to an impractical extent. This excessive increase of the circuit scale will also make it difficult to realize a satisfactory characteristic by means of a simple system. This leads to the problem that it is impossible to attain an appropriate setting according to the state of photography or the conditions of a subject to be photographed.

SUMMARY OF THE INVENTION

It is, therefore, an object of the present invention to solve the above-described problems.

Another object of the present invention is to provide a novel and improved image pickup apparatus which can be reduced in size and low power consumption because of its reduced circuit scale and in which no degradation of image quality occurs at the switching points between individual functions.

To achieve the above-described objects, according to one aspect of the present invention, there is provided an image pickup apparatus which comprises a non-linear circuit for performing non-linear correction of a digitized video signal. The non-linear circuit includes a multiplier having an input terminal formed by input bits the number of which is $n_1$, and $n_1$ is selected to meet a relationship of $n_3 > n_1$, where $n_3$ represents the number of input bits of the non-linear circuit. The non-linear circuit also has predetermined input ranges $R_i$ each of which is selected to be $R_i \leq 2^{n_1}-1$, and is formed by a combination of characteristics of the respective predetermined input ranges $R_i$.

According to another aspect of the present invention, there is provided an image pickup apparatus which comprises a non-linear circuit for performing non-linear correction of a digitized video signal, the non-linear circuit including a function circuit capable of varying a non-linear characteristic, and detecting means for detecting a level in an picked-up image signal.

According to another aspect of the present invention, there is provided an image pickup apparatus arranged to convert a picked-up image signal from analog to digital and perform signal processing in a digital manner. The apparatus comprises a gamma circuit having a gamma region in which a gamma characteristic is obtained by adding together a straight line passing through an origin and a first curve and a region other than the gamma region in which a predetermined characteristic is obtained by adding together a predetermined value and a second curve.

According to another aspect of the present invention, there is provided an image pickup apparatus which comprises a non-linear correction circuit of a type which is arranged to obtain a non-linear correction characteristic by switching of a plurality of functions, and the non-linear correction characteristic is varied by varying constant terms contained in the respective plurality of functions.

According to another aspect of the present invention, there is provided an image pickup apparatus which comprises an amplifier for amplifying an output signal of an image sensor, the amplifier having a gain which is variable, a first adder for adding a first value to a digital picked-up image signal obtained by analog to digital conversion of an output signal of the amplifier, a non-linear correction circuit for performing non-linear correction of an output signal of the first adder, a second adder for adding a second value to an output signal of the non-linear correction circuit, a multiplier for multiplying an output signal of the second adder by a third value, and a switch for generating a control signal S for controlling the gain of the amplifier, the first value, the second value and the third value. A characteristic of the non-linear correction is varied by varying the gain of the amplifier, the first value, the second value and the third value.

According to one embodiment of the present invention, there is provided an image pickup apparatus which includes a non-linear circuit using a multiplier. The non-linear circuit is formed by a combination of the characteristics of the respective predetermined input ranges $R_i$ each of which is selected to meet $n_3 > n_1$ and $R_i \leq 2^{n_1} - 1$, where $n_3$ represents the number of input bits of the non-linear circuit and $n_1$ represents the number of input bits which form one input side of the multiplier. With this arrangement, since it is possible to realize a non-linear circuit without using a ROM, it is possible to achieve a reduced circuit scale, a cost reduction, a reduction in power consumption and a reduction in the entire size of the apparatus.

According to another embodiment of the present invention, a non-linear circuit used in an image pickup apparatus varies a non-linear characteristic by varying constants contained in individual function circuits in accordance with a level detected by detecting means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 17(*a*), 17(*b*) and 17(*c*) are explanatory views showing the operation of the gamma circuit shown in FIG. 16;

DETAILED DESCRIPTION OF THE PREFERRED EMBODIMENTS

Preferred embodiments of the present invention will be described below with reference to the accompanying drawings.

Figure 1:
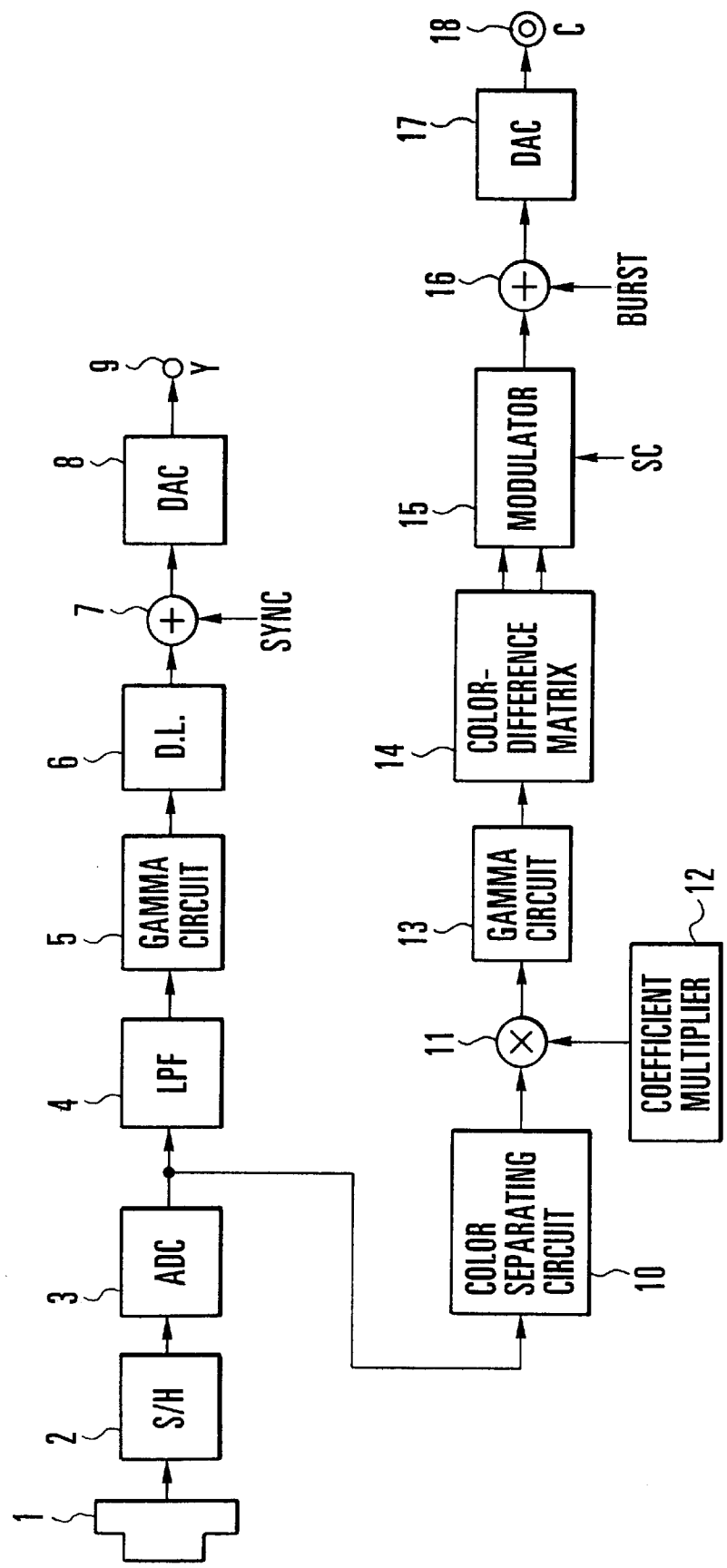
FIG. 1 is a functional block diagram schematically showing a first embodiment of an-image pickup apparatus according to the present invention.

FIG. 1 is a functional block diagram schematically showing a first embodiment of an image pickup apparatus according to the present invention. The arrangement shown in FIG. 1 includes a CCD 1 which serves as an image sensor and has a color separating filter, a sample-and-hold circuit (S/H) 2 for converting the output signal of the CCD 1 into a continuous signal, an A/D converter (ADC) 3 for converting the output signal of the sample-and-hold circuit 2 into a digital signal, and a low-pass filter (LPF) 4 for allowing the passage of only the luminance signal of a picked-up image signal.

The shown arrangement also includes a gamma circuit 5 which is one example of a non-linear circuit, a delay circuit 6 for delaying the luminance signal by a predetermined time period based on a color signal which will be described later, a sync signal adder 7, a D/A converter (DAC) 8, and a luminance signal (Y) output terminal 9.

The shown arrangement further includes a color separating circuit 10 for separating color signals from the picked-up image signal, a multiplier 11 for performing white balance adjustment, a coefficient multiplier 12 for outputting a coefficient for use in white balance adjustment, a gamma circuit 13, a color-difference matrix 14 for forming color-difference signals, a modulator 15 for modulating the color-difference signals by using a chrominance subcarrier, a burst signal adder 16, a D/A converter (DAC) 17, and a chrominance signal (C) output terminal 18.

In operation, a subject image (not shown) which has been formed on the CCD 1 by an optical system (not shown) is subjected to color separation, followed by photo-electric conversion, by the CCD 1. The electrical signal outputted from the CCD 1 is converted into a continuous signal by the sample-and-hold circuit 2, and the continuous signal is converted from analog to digital by the A/D converter 3. The digitized signal is inputted to the low-pass filter 4 and a luminance signal Y is taken out from the digitized signal by the low-pass filter 4. The luminance signal Y is gamma-corrected by the gamma circuit 5. Then, after the gamma-corrected luminance signal Y is delayed by a predetermined amount by the delay circuit 6, a sync signal is added to the delayed signal by the sync signal adder 7. The output signal of the sync signal adder 7 is converted into an analog signal by the D/A converter 8, and the analog signal is outputted through the Y output terminal 9 to external equipment (not shown), such as a television set or a video tape recorder (VTR).

The output signal of the A/D converter 3 is also separated into primary color signals R, G and B by the color separating circuit 10. The multiplier 11 multiplies each of the primary color signals R, G and B by the coefficient set by the coefficient multiplier 12, thereby performing white balance adjustment for adjusting the level of each of the primary color signals R, G and B. The output signal of the multiplier 11 is gamma-corrected by the gamma circuit 13, and the output signal of the gamma circuit 13 is formed into color-difference signals by the color-difference matrix 14. The modulator 15 quadrature-modulates the color-difference signals by using a chrominance subcarrier. The quadrature-modulated output signal of the modulator 15 is inputted to the burst signal adder 16, in which a color burst signal is added to the input signal. The output signal of the burst signal adder 16 is converted into an analog signal by the D/A converter 17, and the analog signal is outputted through the C output terminal 18 similarly to the Y signal.

Figure 2:
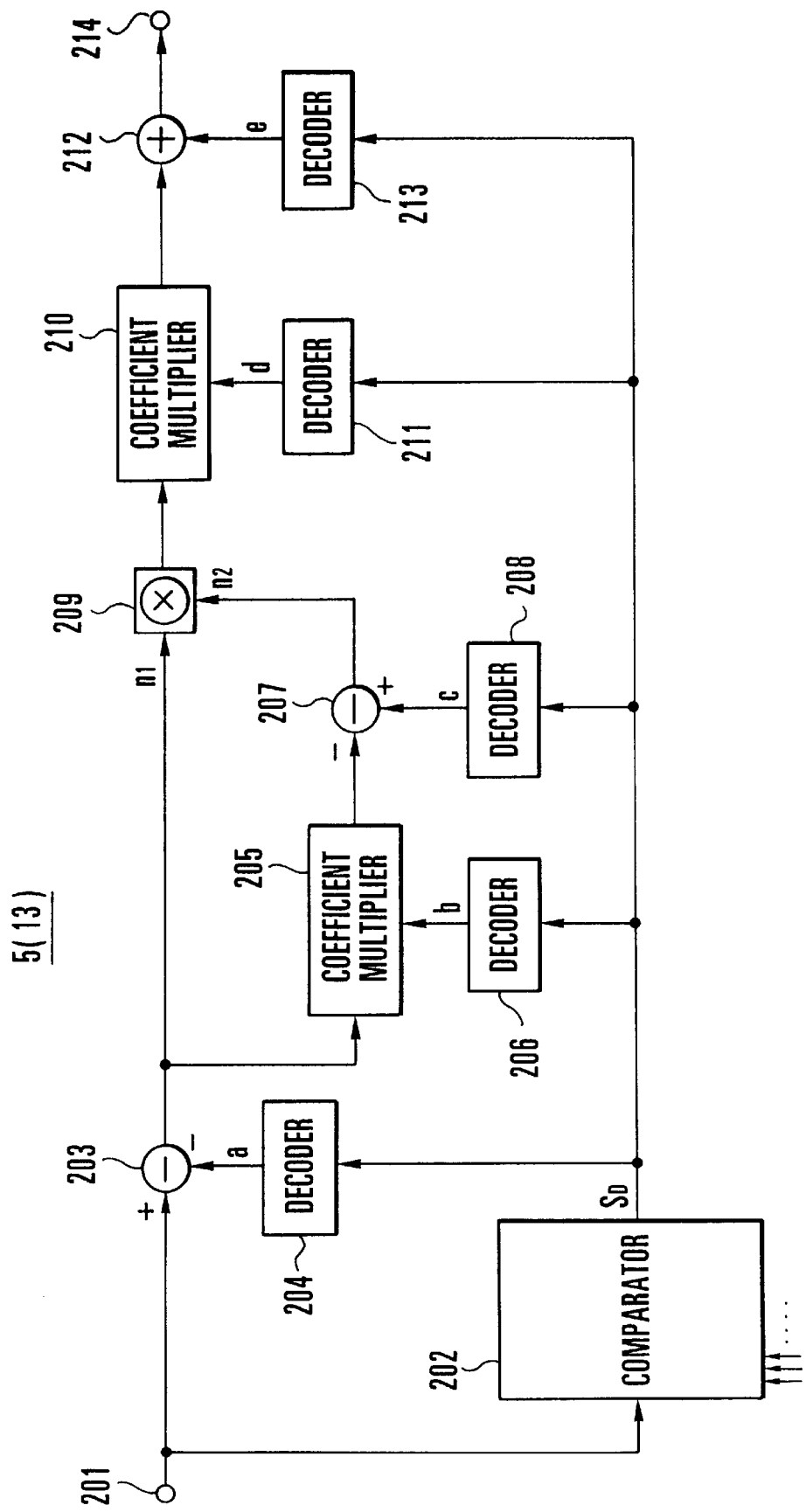
FIG. 2 is a block diagram showing in detail the gamma circuit shown in FIG. 1.

FIG. 2 is a detailed block diagram of each of the gamma circuits 5 and 13 used in the embodiment shown in FIG. 1. The arrangement shown in FIG. 2 includes an input terminal 201, a comparator 202 for comparing an input signal with a plurality of predetermined values and detecting which range corresponds to the range of the input signal, subtractors 203 and 207, and decoders 204, 206, 208, 211 and 213 for generating predetermined constants "a", "c" and "e" as well as predetermined coefficients "b" and "d" in accordance with a selecting signal, respectively. The arrangement also includes coefficient multipliers 205 and 210, a multiplier 209 of $n_1$ bits×$n_2$ bits, an adder 212, and an output terminal 214.

In operation, a signal which has been inputted through the input terminal 201 is supplied to the comparator 202, in which it is detected which part of a predetermined range corresponds to the range of the input signal, and a detection signal $S_D$ is outputted from the comparator 202.

The input signal is also supplied to the subtractor 203, in which the input signal is subtracted from the constant "a" which is generated by and outputted from the decoder 204 in accordance with the detection signal $S_D$. The obtained difference signal is applied to one input terminal of the multiplier 209. The difference signal is also supplied to the coefficient multiplier 205, in which the difference signal is multiplied by the coefficient "b" which is generated by the decoder 206 in accordance with the detection signal $S_D$. The signal outputted from the coefficient multiplier 205 is subtracted by the subtractor 207 from the constant "c" which is similarly generated by the decoder 208, and the obtained difference signal is applied to the other input terminal of the multiplier 209. The output signal of the multiplier 209 is inputted to the coefficient multiplier 210, in which the input signal is multiplied by the coefficient "d" which is generated by the decoder 211. The output signal of the coefficient multiplier 210 is inputted to the adder 212, in which the input signal is added to the constant "e" which is generated by the decoder 213. The resultant signal is outputted through the output terminal 214 to the aforementioned circuit provided at the next stage.

Figure 3A:
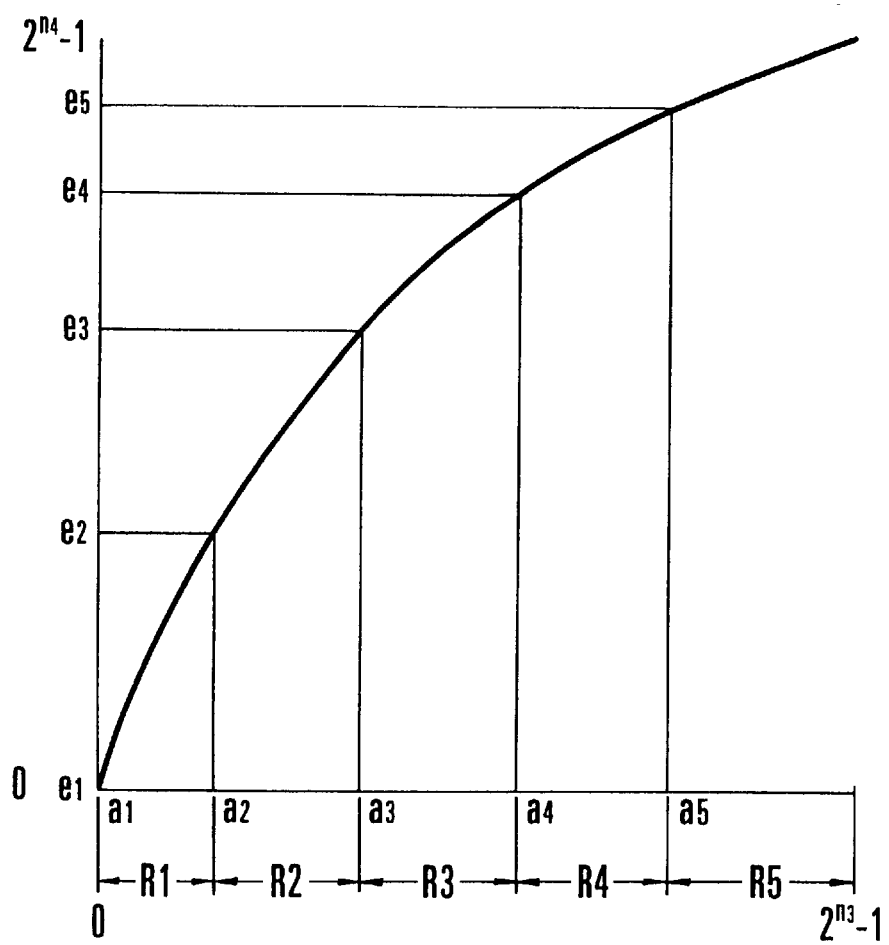
FIGS. 3(*a*) and 3(*b*) are explanatory views showing the operation of the first embodiment shown in FIG. 1.
Figure 3B:
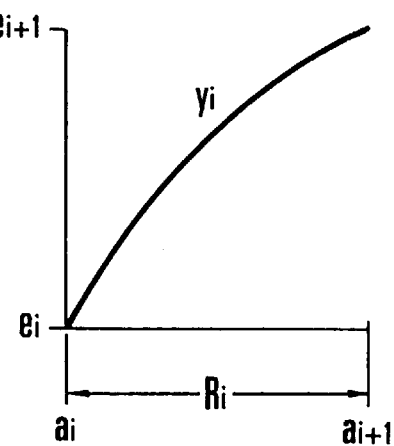

FIGS. 3($a$) and 3($b$) are explanatory views of the gamma circuit 5 (or 13) shown in FIG. 2. In FIG. 3($a$), the horizontal axis represents the input of the gamma circuit, while the vertical axis represents the output of the gamma circuit. If the number of bits of an input signal which is inputted to the gamma circuit is $n_3$, the values of the input range from 0 to $2^{n_3}-1$. It is assumed here that the range of this input is divided into k ranges (k=5 in FIG. 3($a$)) which are indicated by $R_1, R_2, \ldots, R_k$, respectively. The maximum value of each of the ranges $R_1, R_2, \ldots, R_5$ is set to a value smaller than $2^{n_1}-1$ ($n_1$ represents the number of bits of either input of the multiplier 209 shown in FIG. 2).

For example, if $n_3$ is 10, the input values range from 0 to 1023. By dividing this range into five ranges, as shown in FIG. 3($a$), and setting the maximum value of each of these five ranges to a value smaller than 255, $n_1$=8 can be obtained. In FIG. 3($a$), $a_1$ to $a_5$ indicate the input values at the starting points of the respective ranges, while $e_1$ to $e_5$ indicate the corresponding output values, respectively. A single range $R_i$ selected from the five ranges is shown in FIG. 3($b$).

Since the curve $y_i$ shown in FIG. 3($b$) has an upward convex form and passes through the origin ($a_i, e_i$), the curve $y_i$ can be approximated by the following quadratic function:

$$(y_i - e_i) = A_i(x-a_i)^2 + B_i(x-a_i) \quad (A_i \text{ and } B_i\text{:predetermined constants})$$

$$(y_i - e_i) = (x-a_i) \times \{A_i(x-a_i) + B_i\}$$

$$y_i = (x-a_i) \times \{A_i \times (x-a_i) + B_i\} + e_i \tag{1}$$

By changing the values of $a_i$, $e_i$, $A_i$ and $B_i$ in accordance with each range of an input, it is possible to realize the characteristic shown in FIG. 3($a$). If an actual gamma curve is approximated by Equation 1, the values of $A_i$ and $B_i$ become extremely small (approximately $2^{-5}$ to $2^{-15}$), so that the calculation performed by the multiplier 209 results in a decrease in the number of significant bits. For this reason, $A_i$ and $B_i$ are each multiplied by $1/d_i$ ($d_i$<1), and since $A_i$ takes negative values for a line of upward convex form, $b_i = -A_i/d_i$ and $c_i = B_i/d_i$ are substituted into Equation 1, the following equation is obtained:

$$y_i = (x-a_i) \times \{-b_i \times (x-a_i) + c_i\} \times d_i + e_i \tag{2}$$

A circuit based on Equation 2 is shown in FIG. 2.

The manner of finding $A_i$ and $B_i$ at this time is as follows. If the ranges $R_1, R_2, \ldots, R_5$ shown in FIG. 3($a$) are not continuously or smoothly connected from range to range at the respective dividing points ($a_i, e_i$), a pseudo-contour will occur in the picture. Therefore, $$y_i(a_{i+1}) = y_{i+1}(a_{i+1}) \quad \text{(continuity condition)}$$

from this continuity condition, the following equation is obtained:

$$A_iR_i^2 + B_iR_{i-ei+1} \quad (3)$$

and $$y_i'(a_{i+1}) = y_{i+1}'(a_{i+1}) \quad \text{(smoothness condition)}$$

from this smoothness condition, the following equation is obtained:

$$2A_iR_i + B_i = B_{i+1} \quad (4)$$

$B_0$ takes a value of the order of 3–4 since $B_0$ indicates a gain in the neighborhood of x=0. In this case, $A_0$ is found so as to match a gamma characteristic. Subsequently, $A_i$ and $B_i$ are found on the basis of Equations 3 and 4 as well as the condition of the gamma characteristic, and $d_i$ is found so as to match the range of the multiplier 209. Then, $b_i$ and $c_i$ are found.

It is preferable to construct the coefficient multipliers 205 and 210 by using a shift computation and an addition for the sake of simplification of their respective circuit arrangements.

Since $d_i$ is used for adjusting the range of the multiplier 209, it is possible to realize $d_i$ by using only a shift computation under the following condition:

$$d_i = 2^{-Pi} \quad (P_i: \text{natural number}) \quad$$

Also, the gamma circuit can be simplified by selecting $a_i$ within a range of not greater than $2^{n1}-1$ so that $b_i$ can be realized by using only a shift computation if possible.

Figure 4:
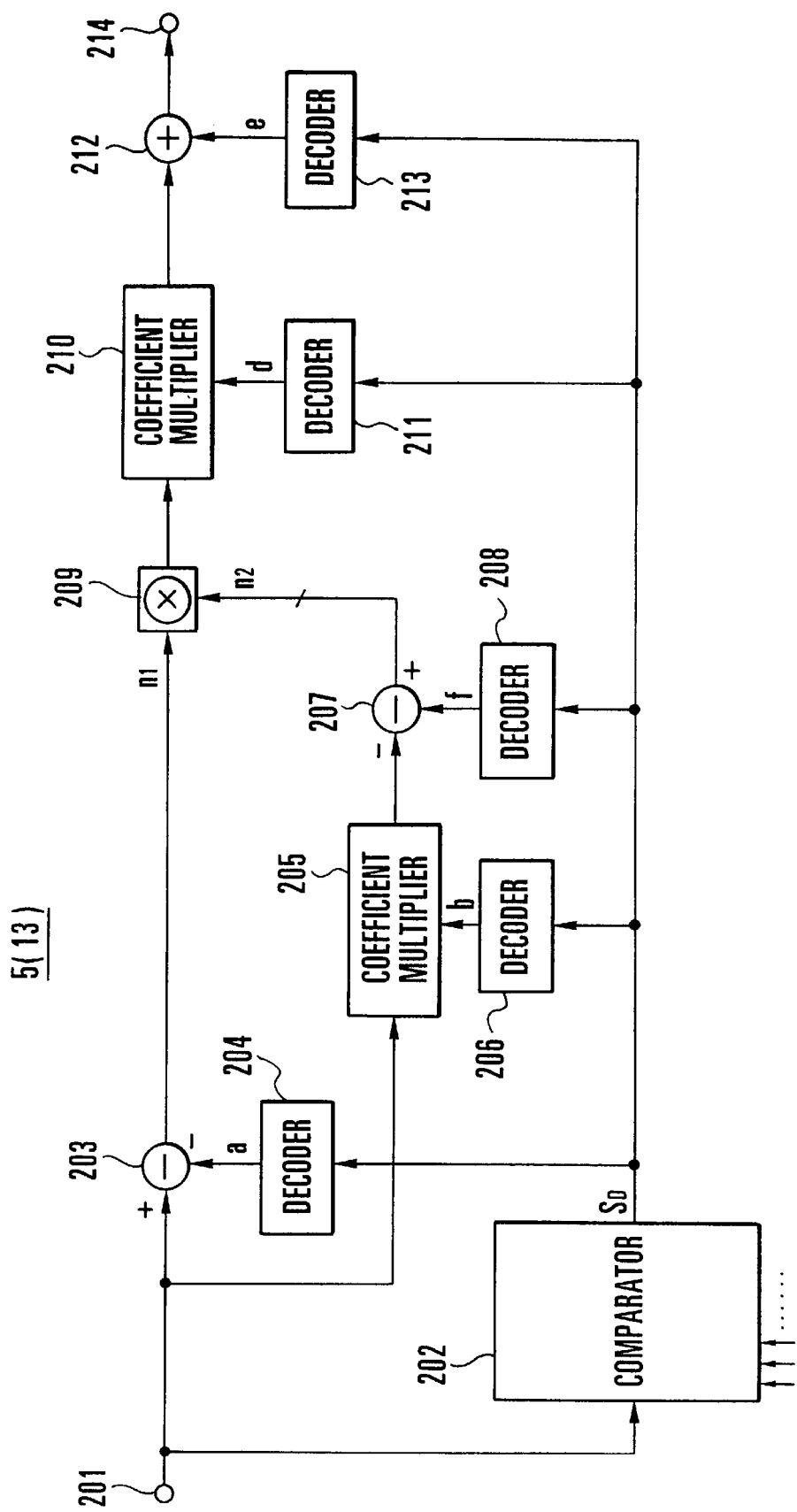
FIG. 4 is a block diagram showing another arrangement example of the gamma circuit shown in FIG. 1.

FIG. 4 shows another example of the arrangement of the gamma circuit 5 (or 13) shown in FIG. 1. In this example, Equation 2 is modified into the following equations:

$$f_i = a_i \times b_i + c_i \quad (5)$$

$$y_i = (x-a_i) \times (-b_i x + f_i) \times d_i + e_i \quad (6)$$

and the input of the coefficient multiplier 205 is connected to the input terminal 201. The constant which is inputted to the subtractor 207 is f which is represented by Equation 5.

A second embodiment of the image pickup apparatus according to the present invention will be described below with reference to FIGS. 5 to 8.

Figure 5:
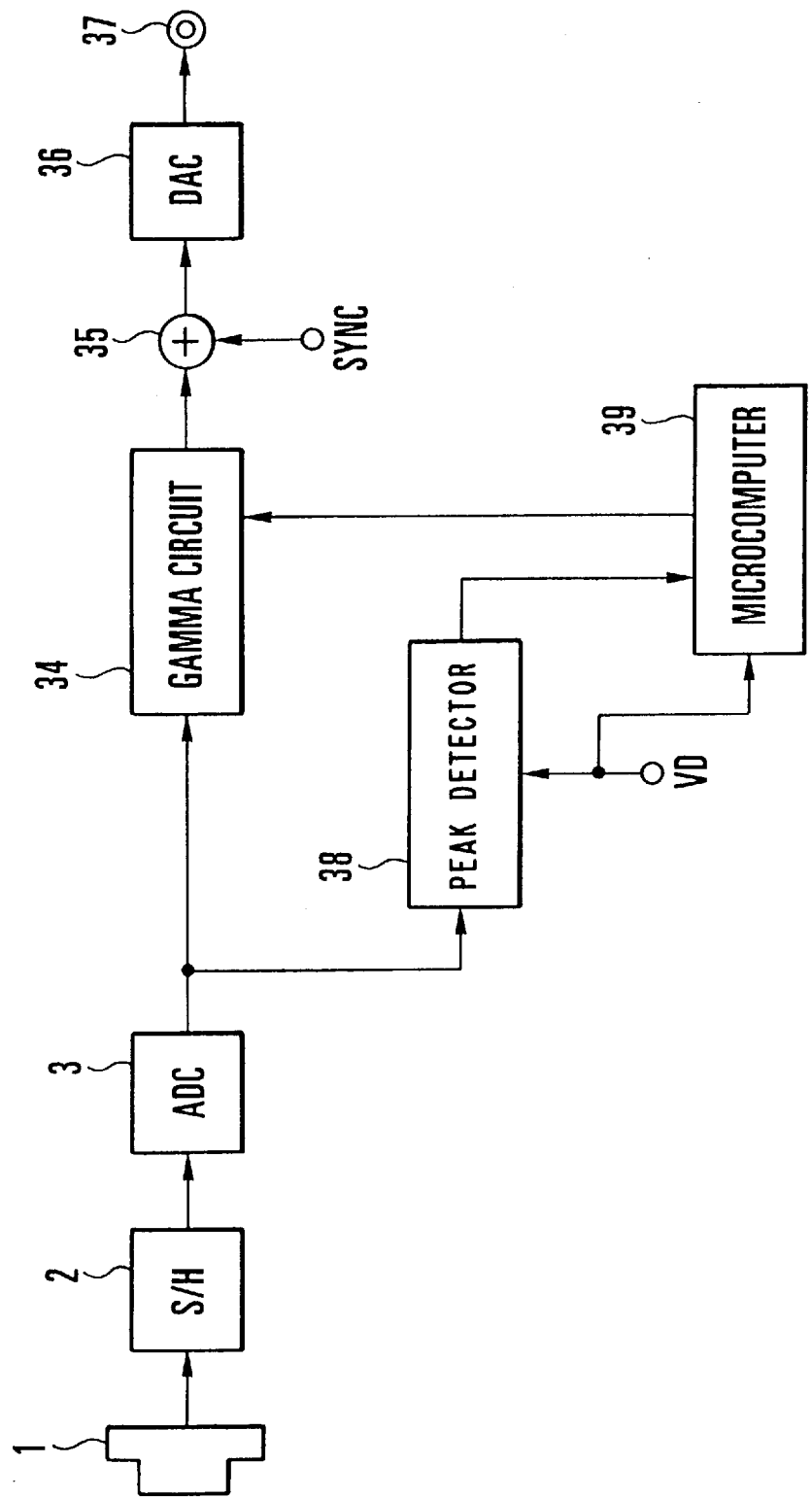
FIG. 5 is a functional block diagram schematically showing a second embodiment of the image pickup apparatus according to the present invention.

The arrangement shown in FIG. 5 includes the CCD 1 which serves as an image sensor, the sample-and-hold circuit (S/H) 2, the A/D converter (ADC) 3, a gamma circuit 34, an adder 35, a D/A converter (DAC) 36, an output terminal 37, a peak detector 38, and a microcomputer 39.

In operation, a subject image (not shown) is formed on the photoelectric conversion surface of the CCD 1 by a photographic optical system (not shown), and is photoelectrically converted into a picked-up image signal. The pickup-image signal outputted from the CCD 1 is converted into a continuous signal by the sample-and-hold circuit 2, and the continuous signal is converted into a digital signal by the A/D converter 3. The digital signal outputted from the A/D converter 3 is gamma-corrected by the gamma circuit 34.

The gamma-corrected signal is applied to the adder 35, in which a sync signal SYNC is added to the gamma-corrected signal. The output signal of the adder 35 is converted from digital to analog by the D/A converter 36, and the analog signal is outputted via the output terminal 37 to external equipment (not shown) as a composite television signal.

The output signal of the A/D converter 3 is also supplied to the peak detector 38, in which its peak level during one vertical period is detected. The peak detector 38 is connected to the microcomputer 39 so that the value of the detected peak level can be read out by the microcomputer 39. The microcomputer 39 is connected to the gamma circuit 34 so that a set value can be written into the gamma circuit 34.

Figure 6:
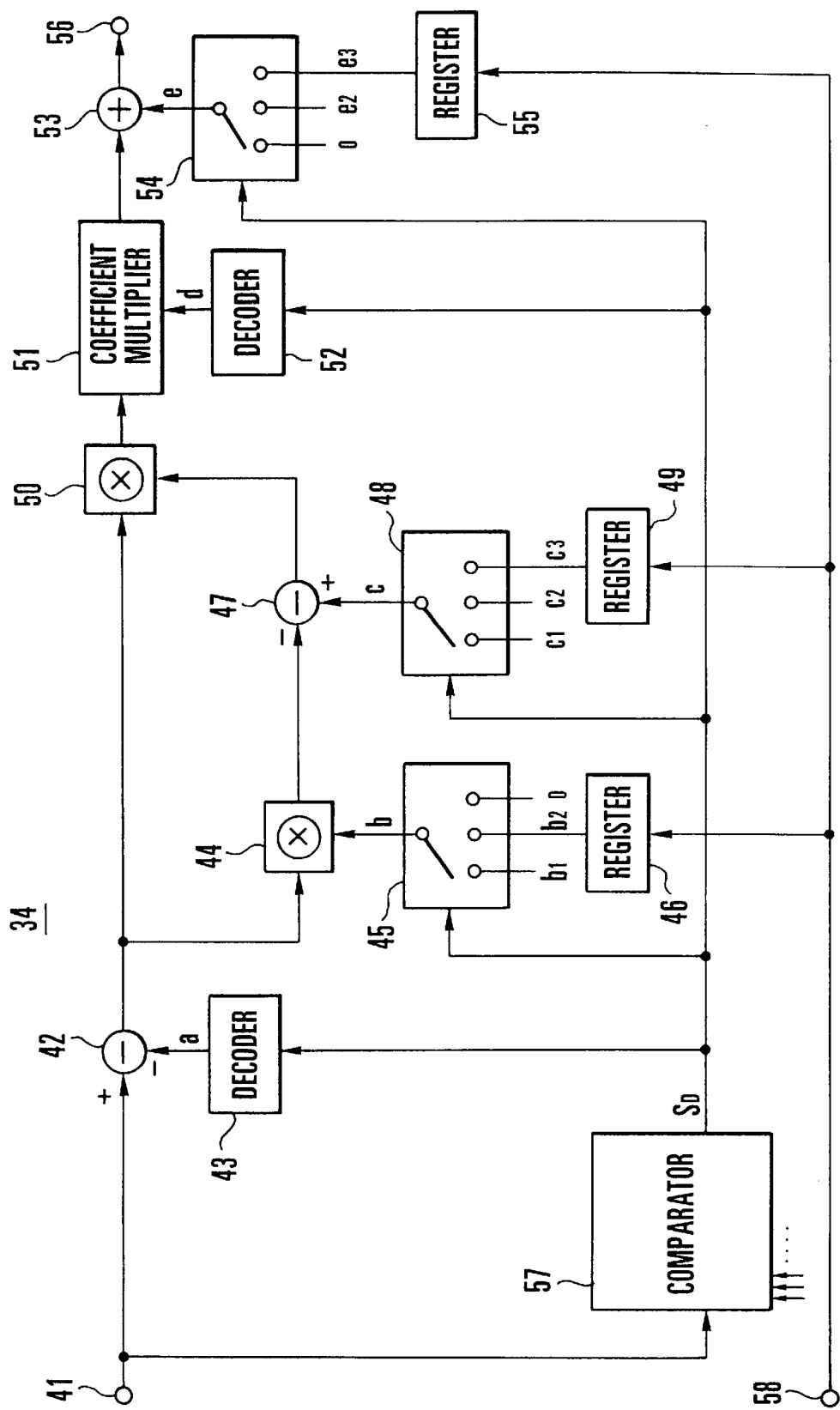
FIG. 6 is a block diagram showing in detail the gamma circuit shown in FIG. 5.

FIG. 6 is a detailed block diagram of the gamma circuit 34 shown in FIG. 5. The arrangement shown in FIG. 6 includes a signal input terminal 41, subtractors 42 and 47, decoders 43 and 52 for generating predetermined coefficients, multipliers 44 and 50, switches 45, 48 and 54, and registers 46, 49 and 55 into which to write a set value from the microcomputer 39. The arrangement also includes a coefficient multiplier 51, an adder 53, an output terminal 56, a comparator 57 for comparing an input signal with a plurality of predetermined values and outputting a detection signal $S_D$ which indicates the range of the input signal, and a setting signal input terminal 58.

In operation, an input signal which has been inputted through the signal input terminal 41 is supplied to the subtractor 42. In the subtractor 42, a constant "a" which is generated by the decoder 43 in accordance with the detection signal $S_D$ is subtracted from the input signal. Then, the obtained difference signal is supplied to the multiplier 44, in which it is multiplied by a value "b" outputted from the switch 45 which is arranged to select any one of predetermined values 0, $b_1$ and a value $b_2$ of the register 46 in accordance with the detection signal $S_D$ and output the selected value as the value "b". The output signal of the multiplier 44 is supplied to the subtractor 47, in which the signal is subtracted from a value "c" outputted from the switch 48 which is arranged to select any one of predetermined values $c_1$, $c_2$ and a value $c_3$ of the register 49 in accordance with the detection signal $S_D$ and output the selected value as the value "c".

The output signal of the subtractor 47 is multiplied by the output signal of the subtractor 42 in the multiplier 50, and, in the coefficient multiplier 51, the output signal of the multiplier 50 is multiplied by a value "d" which is generated by the decoder 52 in accordance with the detection signal $S_D$. Then, in the adder 53, the output signal of the coefficient multiplier 51 is added to a value "e" which is outputted from the switch 54 which is arranged to select any one of predetermined values $e_1$, $e_2$ and a value $e_3$ of the register 55 in accordance with the detection signal $S_D$ and output the selected value as the value "e". The output signal of the adder 53 is outputted to the adder 35 of FIG. 5 through the output terminal 56.

The input signal which has been inputted through the signal input terminal 41 is also supplied to the comparator 57, in which the input signal is compared with the plurality of predetermined values. The comparator 57 generates the detection signal $S_d$ and applies it to each part in the above-described manner.

Also, values specified by the microcomputer 39 are respectively written into the registers 46, 49 and 55 by a setting signal which has been inputted through the setting signal input terminal 58.

Figure 7A:
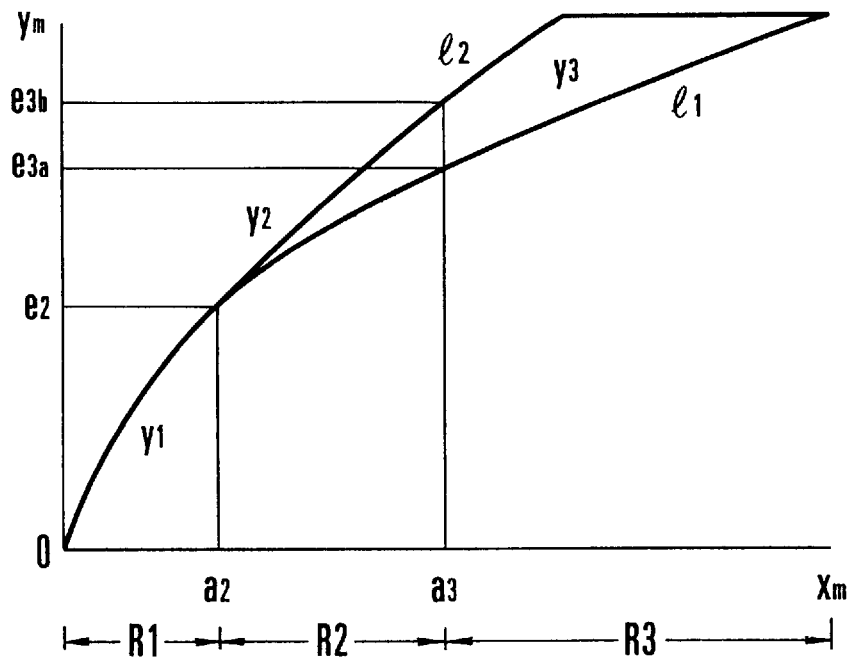
FIGS. 7(*a*) and 7(*b*) are explanatory views showing the operation of the second embodiment shown in FIG. 5.
Figure 7B:
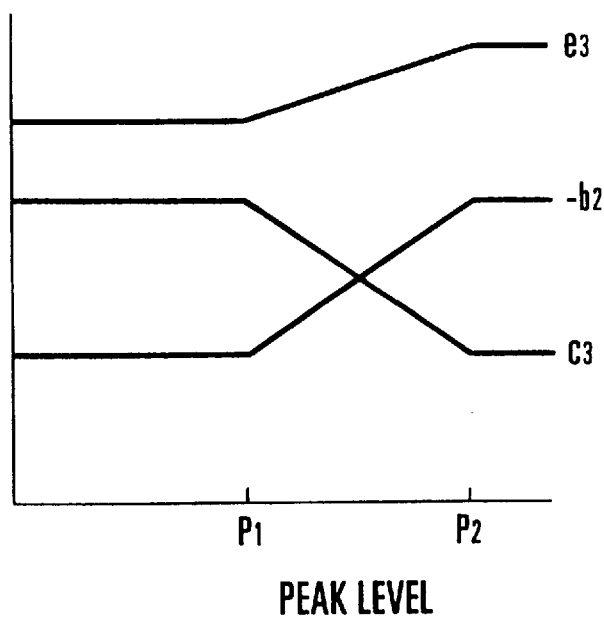

FIGS. 7(a) and 7(b) are explanatory views of the operation of the second embodiment. FIG. 7(a) shows the input-output characteristic of the gamma circuit 34. The values of the input signal range from 0 to $x_m$, while the values of the output signal range from 0 to $y_m$. These ranges are each divided into three ranges $R_1$ (0 to $a_2$), $R_2$ ($a_2$ to $a_3$) and $R_3$ ($a_3$ to $x_m$). The gamma characteristic is approximated by a predetermined quadratic function $y_1$ in the range $R_1$; by a variable quadratic function $y_2$ in the range $R_2$; and by a variable linear function $y_3$ in the range $R_3$. $y_1$, $y_2$ and $y_3$ are expressed as follows:

$$y_1 = x \times (b_1 x + c_1) \quad (7)$$

$$y_2 = (x-a_2) \times (b_2(x-a_2) + c_2) + e_2 \quad (8)$$

$$y_3 = (x-a_3) \times c_3 + e_3 \qquad (9)$$

To connect the functions $Y_1$ and $Y_2$ continuously and smoothly from range to range in FIG. 7(a), the following equations are obtained:

from $y_1(a_2) = y_2(a_2)$ $$a_2{}^2 b_1 + a_2 c_1 = e_2 \qquad (10)$$

from $y_1'(a_2) = y_2'(a_2)$ $$2a_2 b_1 + c_1 = c_2 \qquad (11)$$

Similarly, in the case of the functions $y_2$ and $y_3$, from $y_2(a_3) = y_3(a_3)$ $$(a_3-a_2)^2 b_2 + (a_3-a_2) C_2 = e_3 \qquad (12)$$

from $y_2'(a_3) = y_3'(a_3)$ $$2(a_3-a_2) b_2 + c_2 = e_3 \qquad (13)$$

To satisfy Equations 10 and 11, $c_2$ and $e_2$ are fixed values. At this time, by ma king $b_2$ variable, the value of $y_2(a_3)$ can be varied. It can also be seen from Equations 12 and 13 that if $y_2$ is determined, $y_3$ is primarily determined.

Accordingly, to vary the gamma characteristic as shown by $l_1$ and $l_2$ in FIG. 7(a), it is only necessary to find the corresponding $c_3$ and $e_3$ from Equations 12 and 13 while using $b_2$ as a parameter.

FIG. 7(b) is a graphic representation showing how $b_2$ is made to vary in accordance with a detected peak level as well as how $c_3$ and $e_3$ vary with the variation of $b_2$. In FIG. 7(b), since $b_2$ takes a negative value, $b_2$ indicates $-b_2$. If the peak level is lower than a predetermined value $P_1$, $-b_2$ is set to a predetermined value. If the peak level exceeds $P_1$, $-b_2$ gradually increases with the increase of $P_1$, and if the peak level is not lower than $P_2$, $-b_2$ is set to another predetermined value. If $-b_2$ increases excessively, the inclination of $y_2$ becomes negative midway. For this reason, $-b_2$ is not increased if the peak level is not lower than $P_2$.

As can be seen from Equations 12 and 13, $c_3$ and $e_3$ vary with the variation of the value of $b_2$ as shown in FIG. 7(b). In an actual circuit, the number of significant digits decreases due to a cancellation of significant digits in the multiplier 50. Therefore, $b_i$ and $c_i$ are each multiplied by 1/d (d<1), and the polarity of $b_i$ is reversed because of its negative polarity to obtain the following equations:

$$y_1 = x \times (-b_1 x + c_1) \times d_1$$

$$y_2 = (x-a_2) \times (-b_2 x + c_2) \times d_2 + e_2$$

$$y_3 = c_3 (x-a_3) \times d_3 + e_3$$

Figure 8:
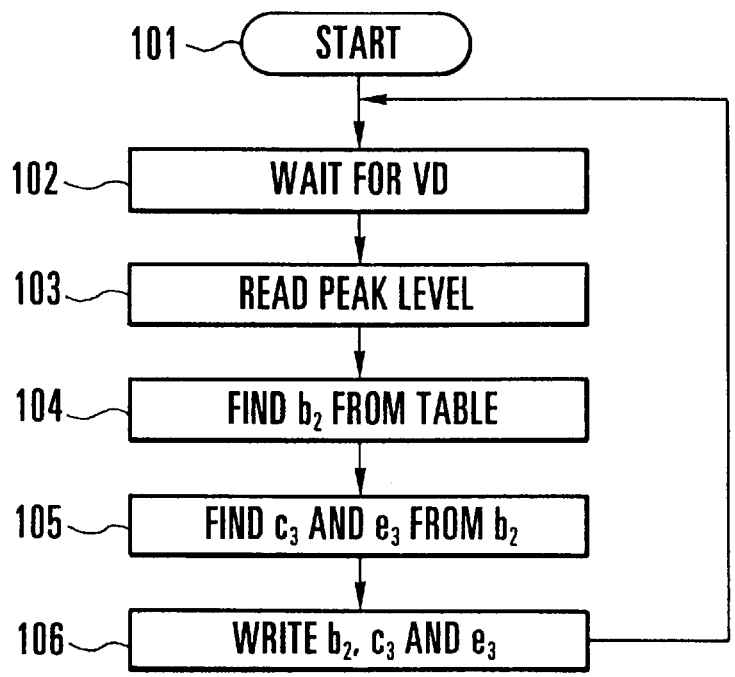
FIG. 8 is a flowchart showing the operation of the second embodiment shown in FIG. 5.

FIG. 8 is a flowchart showing the operation of the microcomputer 39 used in the second embodiment.

The flow starts in Step 101. In Step 102, the flow waits until a vertical sync pulse VD is inputted. If the vertical sync pulse VD is inputted, the microcomputer 39 reads a peak level from the peak detector 38 in Step 103. Then, in Step 104, on the basis of the value of the read peak level, $b_2$ is found from the table shown in FIG. 7(b). In Step 105, $C_3$ and $e_3$ are found by using Equations 12 and 13, and, in Step 106, the obtained $b_2$, $c_3$ and $e_3$ are respectively written into the registers 46, 49 and 55. The flow returns to Step 102.

Incidentally, in the second embodiment, the peak detector 38 may also use a maximum value detecting circuit and a minimum value detecting circuit to find the difference between maximum and minimum values and obtain contrast information so that the gamma characteristic can be varied. Otherwise, it is also possible to employ information on the degree of opening of a diaphragm, the difference between the maximum and minimum values of the values obtained by dividing one picture into n areas and individually integrating the n areas, or white balance information.

Figure 9:
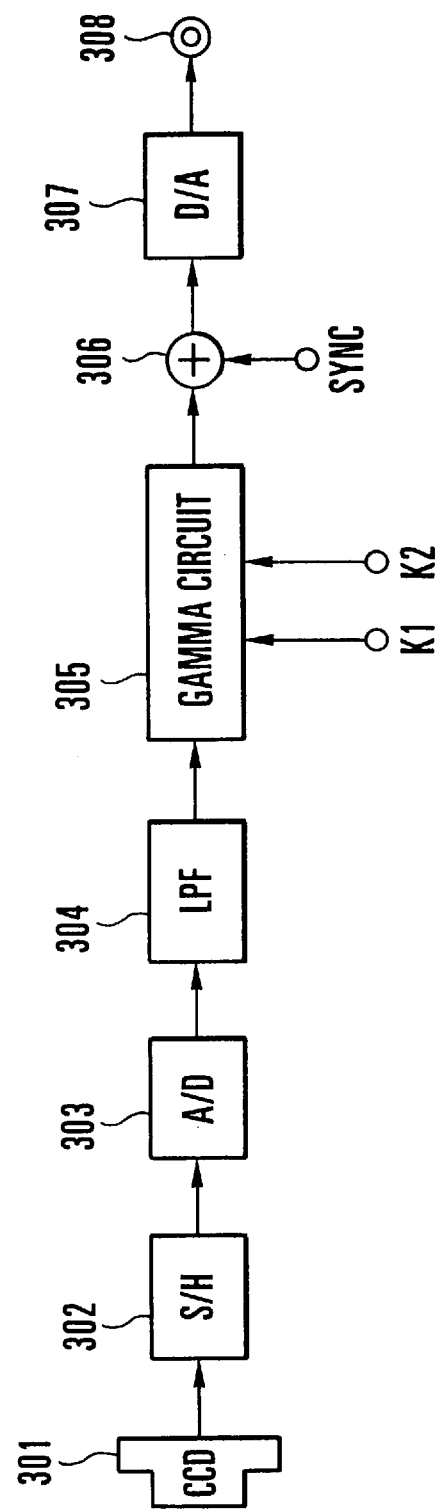
FIG. 9 is a block diagram schematically showing a third embodiment of the image pickup apparatus according to the present invention.

FIG. 9 is a schematic block diagram showing a third embodiment of the image pickup apparatus according to the present invention.

The arrangement shown in FIG. 9 includes a CCD 301 which serves as an image sensor, a sample-and-hold circuit 302 for converting the output signal of the CCD 301 into a continuous signal, an A/D converter 303, a low-pass filter 304, a gamma circuit 305 having characteristic varying terminals and capable of varying its characteristic, an adder 306, a D/A converter 307, and an output terminal 308.

The low-pass filter 304, the gamma circuit 305 and the adder 306 are each formed by a digital circuit.

In operation, a subject image (not shown) is formed on the photoelectric conversion surface of the CCD 301 by a photographic optical system (not shown), and is photoelectrically converted into a video signal. The video signal is converted into a continuous signal by the sample-and-hold circuit 302, and the continuous signal is converted into a digital video signal by the A/D converter 303. The digital signal is limited to a necessary band by the low-pass filter 304. The output signal of the low-pass filter 304 is supplied to the gamma circuit 305, in which the signal is subjected to gamma correction of characteristic according to coefficients K1 and K2 inputted to the two characteristic varying terminals of the gamma circuit 305. The output signal of the gamma circuit 305 is supplied to the adder 306, in which a sync signal is added to the signal. The output signal of the adder 306 is converted into an analog signal by the D/A converter 307, and the analog signal is outputted via the output terminal 308 to external equipment (not shown) such as a VTR or a television set.

Figure 10:
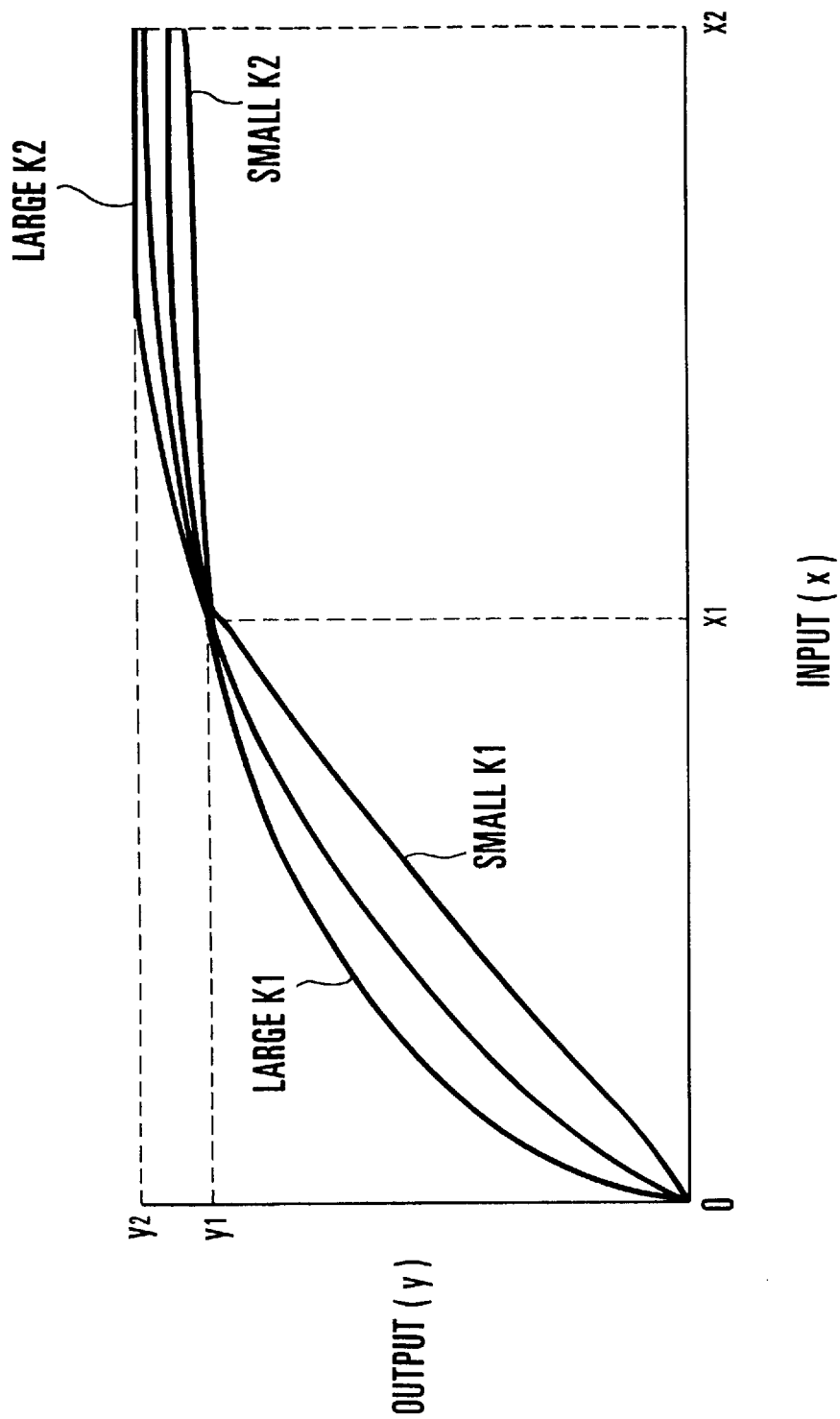
FIG. 10 is an explanatory view showing the operation of the third embodiment shown in FIG. 9.

FIG. 10 is an explanatory view of the operation of the gamma circuit 305 shown in FIG. 9. In FIG. 10, the horizontal axis x and the vertical axis y represent the input and the output of the gamma circuit 305, respectively.

The value of an output $y_1$ indicates a 100% white level, and the signal level outputted from the output terminal 308 at this time becomes the reference white level of a television signal.

The value of an output $y_2$ indicates a white clip level, and the signal level outputted from the output terminal 308 at this time becomes the white clip level of a television signal.

$x_1$ and $x_2$ are inputs corresponding to $y_1$ and $y_2$, respectively. $x_1$ and $x_2$ normally indicate the standard output level and the saturation output level of the CCD 301, respectively, and $x_2 = 2x_1$ to $5x_1$. In FIG. 10, $x_2 = 2x_1$ by way of explanation. In general, the range between 0 and $x_1$ is called a gamma region, while the range between $x_1$ and $x_2$ is called a knee region.

If the coefficient K1 shown in FIG. 9 is made variable, the gamma characteristic varies within the range of the inputs 0 to $x_1$ and within the range of the outputs 0 to $y_1$, as shown in FIG. 10. In this case, the gamma characteristic curve varies in such a manner as to necessarily pass through the point (0, 0) and the point ($x_1$, $y_1$). If the coefficient K1 is set to a predetermined value, a standard gamma characteristic ($y = x^{0.45}$) is obtained. As K1 is made larger, the curvature of the curve becomes larger as shown in FIG. 10, while as K1 is made smaller, the curve progressively approaches a straight line.

Also, if the coefficient K2 shown in FIG. 9 is made variable, the gamma characteristic varies within the range of the inputs $x_1$ to $x_2$ and within the range of the outputs $y_1$ and $y_2$, as shown in FIG. 10. In this case, the gamma characteristic curve varies in such a manner as to necessarily pass through the point $(x_1, y_1)$. If the coefficient K2 is set to a predetermined value, the curve becomes a straight line which passes through the point $(x_2, y_2)$. As K2 is made larger, the inclination of the curve becomes larger, while as K2 is made smaller, the inclination becomes smaller. If the value of y is larger than $y_2$, the curve is clipped at $y_2$.

Figure 11:
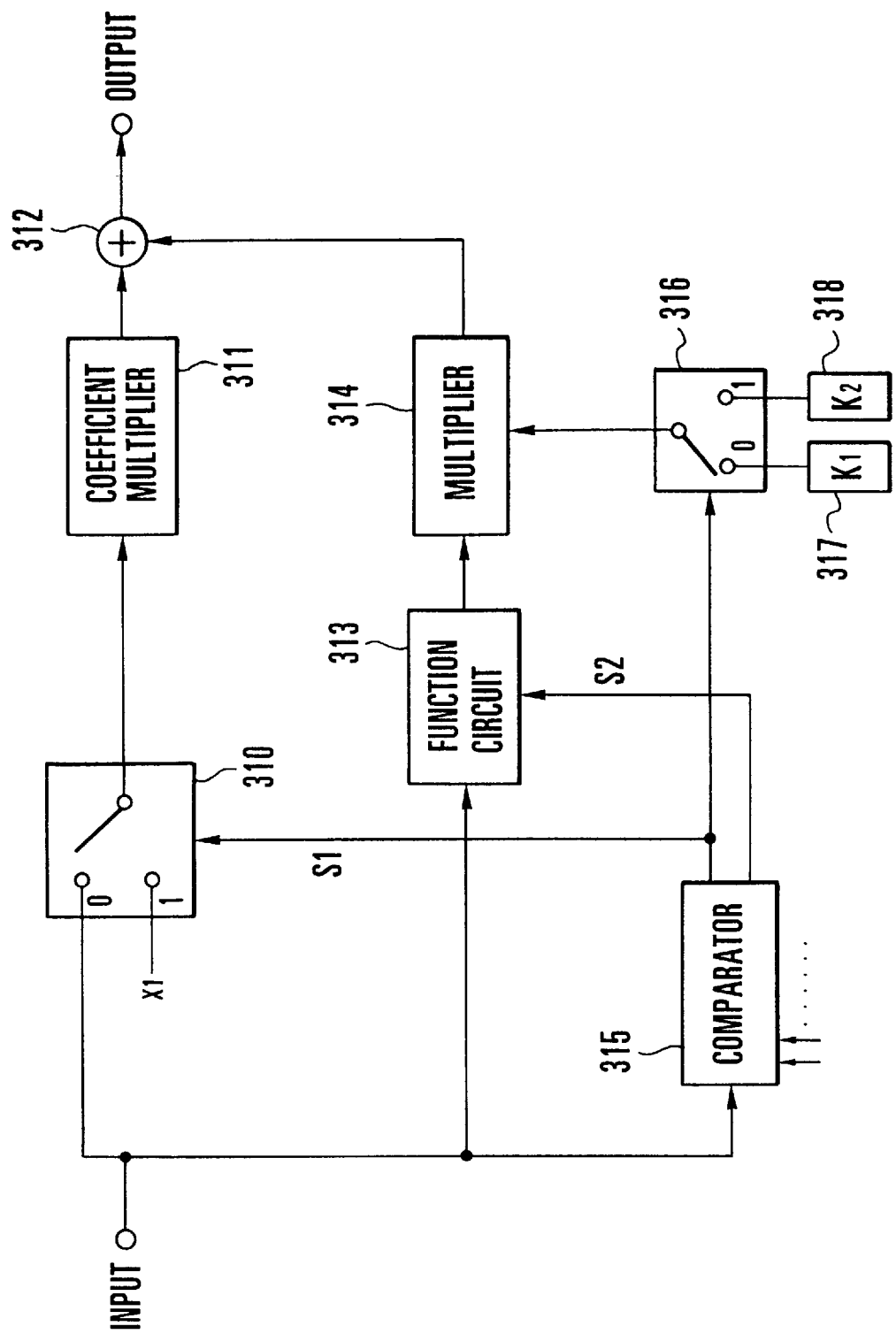
FIG. 11 is a detailed block diagram of the gamma circuit shown in FIG. 9.

FIG. 11 is a detailed block diagram of the gamma circuit 305 shown in FIG. 9. The gamma circuit 305 includes a switch 310 responsive to a control signal S1 for performing switching between a path along which to pass an input signal and a path along which to output a predetermined value $x_1$, a coefficient multiplier 311 for multiplying the input signal by a predetermined coefficient $u=y_1/x_1$, an adder 312, a function circuit 313 for generating a function according to a control signal S2, a multiplier 314, a comparator 315 for comparing the input signal with a predetermined value and outputting the predetermined control signals S1 and S2 according to the comparison result, a switch 316 for performing switching in accordance with the control signal S1, and registers 317 and 318 for holding the values of the respective coefficients K1 and K2.

In operation, an input signal is first compared with the predetermined value by the comparator 315, and the comparator 315 outputs the control signal S1 to the switches 310 and 316 and the control signal S2 to the function circuit 313 in accordance with the comparison result. If S1=0, the input signal passes through the switch 310 and is multiplied by the predetermined value u by the coefficient multiplier 311, and the output signal of the coefficient multiplier 311 is applied to one input of the adder 312. Also, according to the input signal, a predetermined function is generated by the function circuit 313, and in the multiplier 314 the value of the predetermined function is multiplied by the coefficient K1 selected by the switch 316. The output signal of the multiplier 314 is added to the output signal of the coefficient multiplier 311 in the adder 312, and the addition result is outputted from the adder 312.

If S1=1, the predetermined value $x_1$ is outputted from the switch 310 and is multiplied by the predetermined value u by the coefficient multiplier 311. The multiplication result is supplied to the adder 312 as $y_1$. Also, in the multiplier 314, the output signal of the function circuit 313 is multiplied by the coefficient K2 selected by the switch 316. The multiplication result is added to $y_1$ in the adder 312, and the addition result is outputted from the adder 312.

Figure 12A:
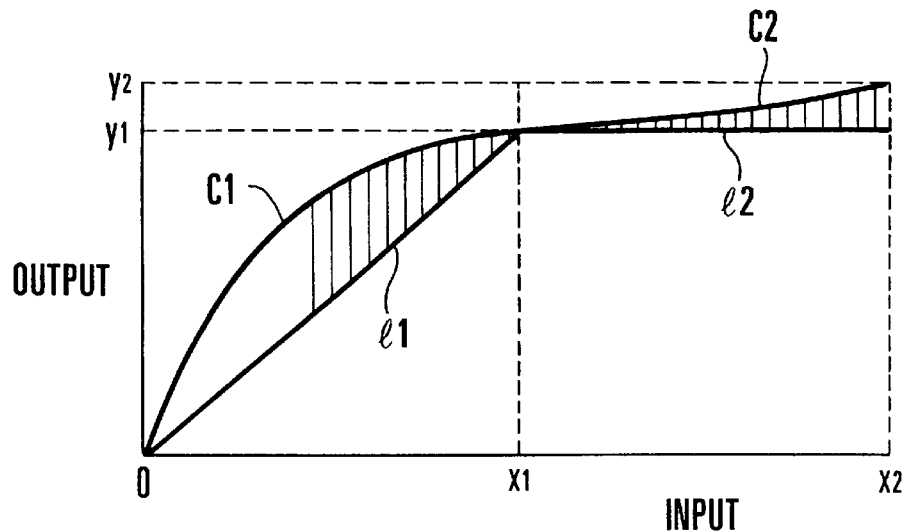
FIGS. 12(*a*), 12(*b*) and 12(*c*) are explanatory views showing the operation of the third embodiment shown in FIG. 11.
Figure 12B:
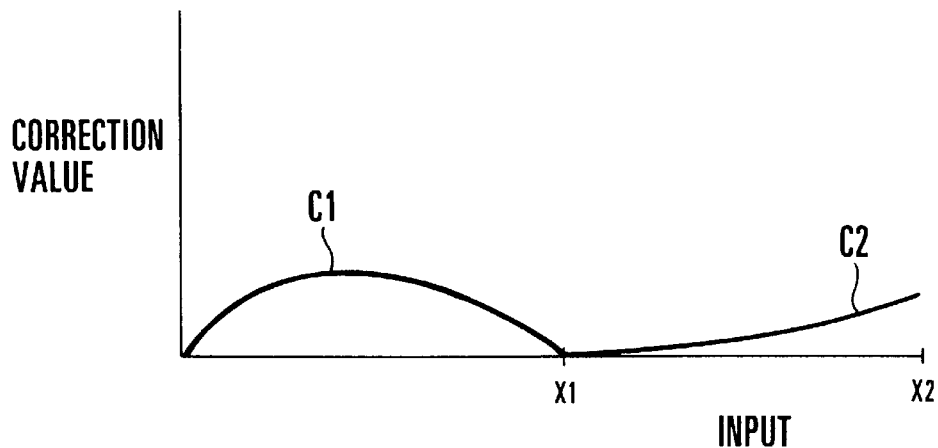
Figure 12C:
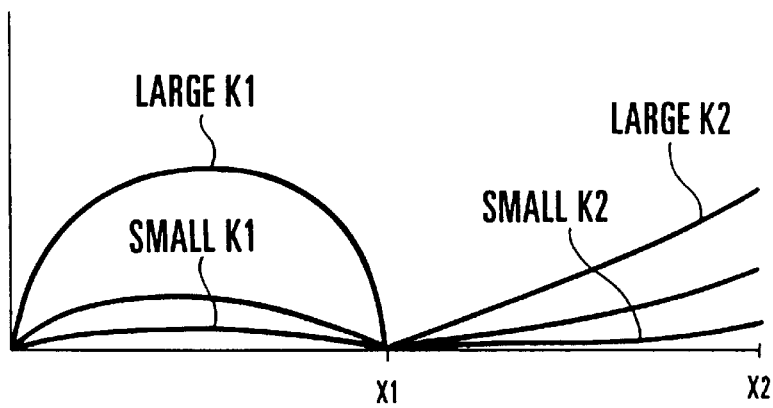

FIGS. 12(a), 12(b) and 12(c) are explanatory views of the operation of the gamma circuit 305 of FIG. 11.

In FIG. 12(a), the required gamma characteristic is shown as being divided into straight lines $l_1$ and $l_2$ and curves (hatched parts) C1 and C2. In this case, $l_1: y=(y_1/x_1)x=ux$ $(0 \leq x \leq x_1)$ $l_2: y=y_1 (x_1 \leq x \leq x_2)$ The straight lines $l_1$ and $l_2$ are connected to each other at the point $(x_1, y_1)$. The straight lines $l_1$ and $l_2$ are each created by the comparator 315, the switch 310 and the coefficient multiplier 311. Also, the values of the respective curves C1 and C2 are "0" at the points of x=0 and x=$x_1$. FIG. 12(b) shows only the curves C1 and C2 taken from FIG. 12(a). The characteristic of the function circuit 313 is selected so as to generate the characteristic shown in FIG. 12(b). FIG. 12(c) shows the combined input-output characteristic of the function circuit 313 and the multiplier 314. The characteristic varies within the range of 0 to $x_1$ in accordance with the coefficient K1 and within the range of $x_1$ to $x_2$ in accordance with the coefficient K2. By adding together the output characteristic shown in FIG. 12(c) and the characteristics of the switch 310 and the coefficient multiplier 311 shown in FIG. 12(a), the input-output characteristic of FIG. 10 is obtained.

Figure 13:
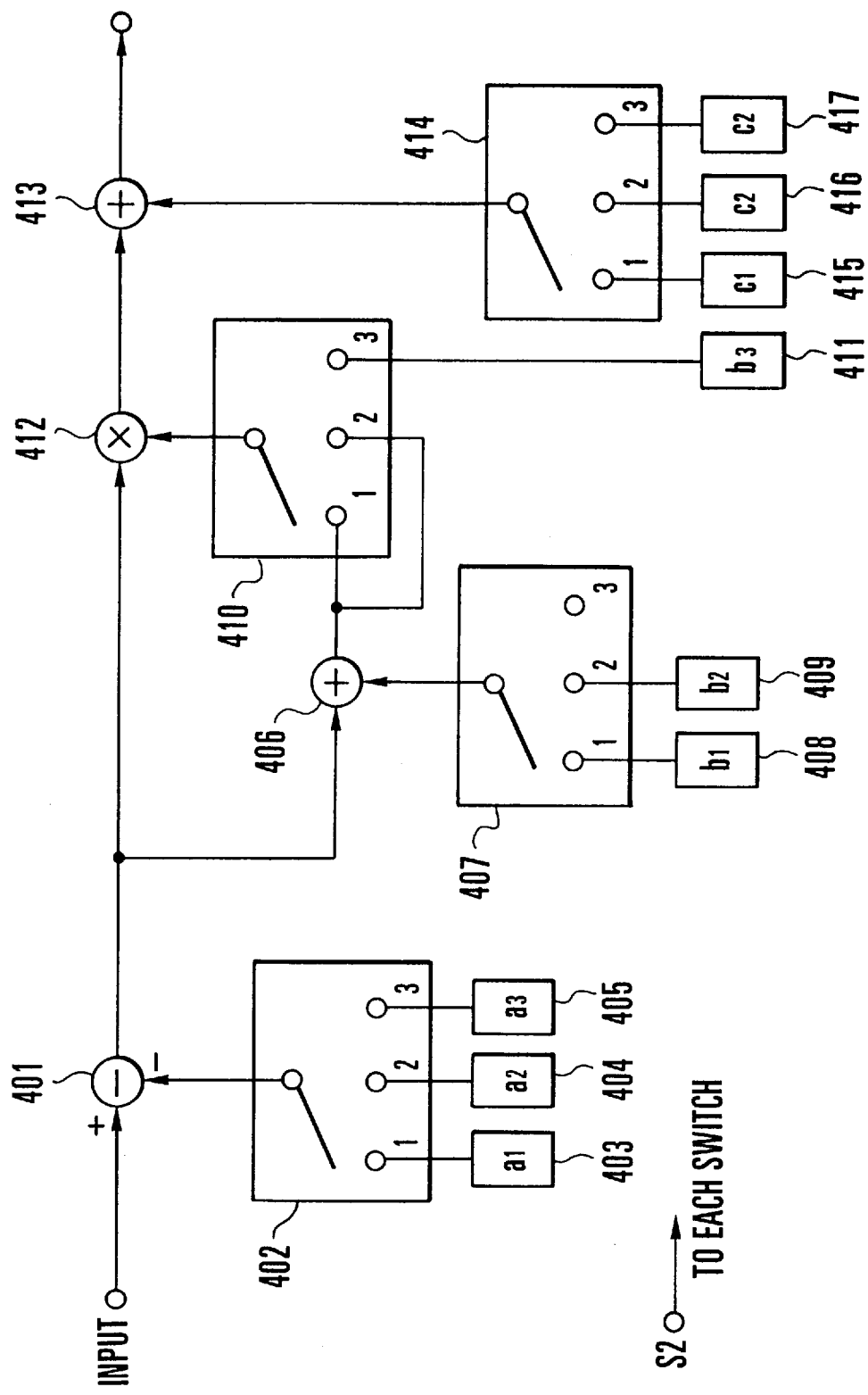
FIG. 13 is a detailed block diagram of the function circuit shown in FIG. 11.

FIG. 13 is a detailed block diagram of the function circuit 313 shown in FIG. 11. The function circuit 313 includes a subtractor 401, switches 402, 407, 410 and 414 which are switchable by the control signal S2, decoders 403, 404, 405, 408, 409, 411, 415, 416 and 417 for outputting values $a_1$, $a_2$, $a_3$, $b_1$, $b_2$, $b_3$, $c_1$, $c_2$ and $c_3$, respectively, adders 406 and 413, and a multiplier 412.

In operation, when an input signal is supplied to the subtractor 401, the switch 402 selects any one value from the values $a_1$, $a_2$ and $a_3$ in accordance with the control signal S2, and the selected value is subtracted from the input signal in the subtractor 401. The output signal of the subtractor 401 is supplied to the adder 406, in which either one of the values $b_1$, and $b_2$ which has been selected by the switch 407 is added to the signal. The switch 410 selects either one of the output signal of the adder 406 and the value $b_3$, and the selected one is multiplied by the output signal of the subtractor 401 in the multiplier 412. In the adder 413, the output signal of the multiplier 412 is added to any one of the values $c_1$, $c_2$ and $C_3$ which has been selected by the switch 414. The addition result is outputted from the adder 413.

Figure 14:
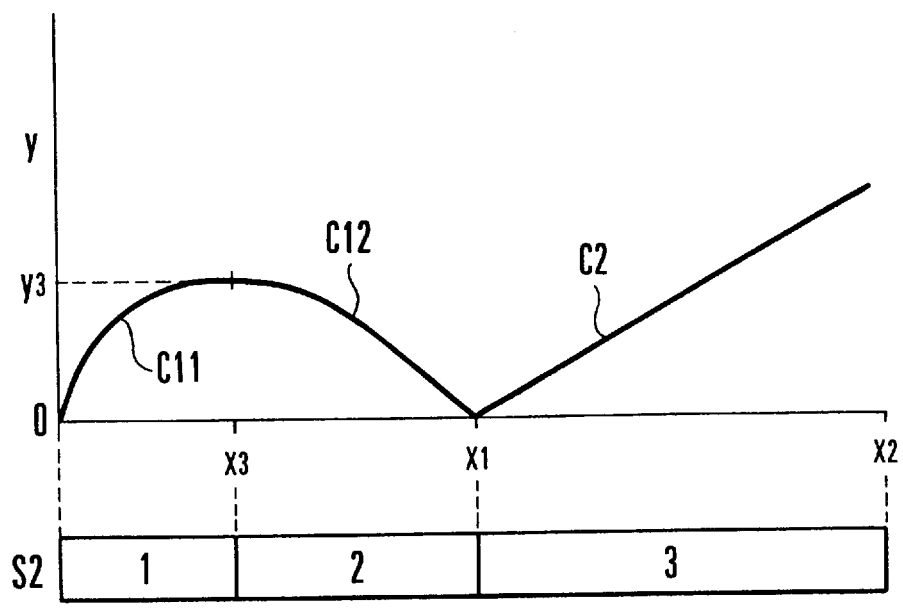
FIG. 14 is an explanatory view showing the operation of the function circuit shown in FIG. 13.

FIG. 14 is an explanatory view of the operation of the function circuit 313 shown in FIG. 13. As shown in FIG. 14, the characteristic shown in FIG. 12(b) is divided into three ranges of 0 to $x_3$, $X_3$ to $x_1$ and $x_1$ to $x_2$, and the aforementioned comparator 315 generates the control signal S2 which satisfies the following relationships:

$0 \leq x < x_3 \rightarrow S2=1$ $x_3 \leq x < x < x_1 \rightarrow S2=2$ $x_1 \leq x \rightarrow S2=3$ The range of 0 to $x_3$ is represented by a first quadratic curve C11:

$y=(x-a_1) \times ((x-a_1)+b_1)+c_1$

The range of $X_3$ to $x_1$ is represented by a second quadratic curve C12:

$y=(x-a_2) \times ((x-a_2)+b_2)+c_2$

The range of $x_1$ to $x_2$ is represented by a straight line C2:

$y=(x-a_3) \times b_3+c_3$

It is preferable to select each of the above coefficients so that the required gamma characteristic can be approximated under the following conditions:

C11: Passes through (0, 0).
C12: Passes through ($x_1$, 0).
  Takes the same value as C11 at $x_3$.
  Takes the same differential coefficient as C11 at $x_3$ (smoothly joins to C11).
C2 : Passes through ($x_1$, 0).

By using the thus-obtained individual coefficients in the circuit of FIG. 13, it is possible to provide the function circuit 313 having the characteristic of FIG. 12(b).

Figure 15:
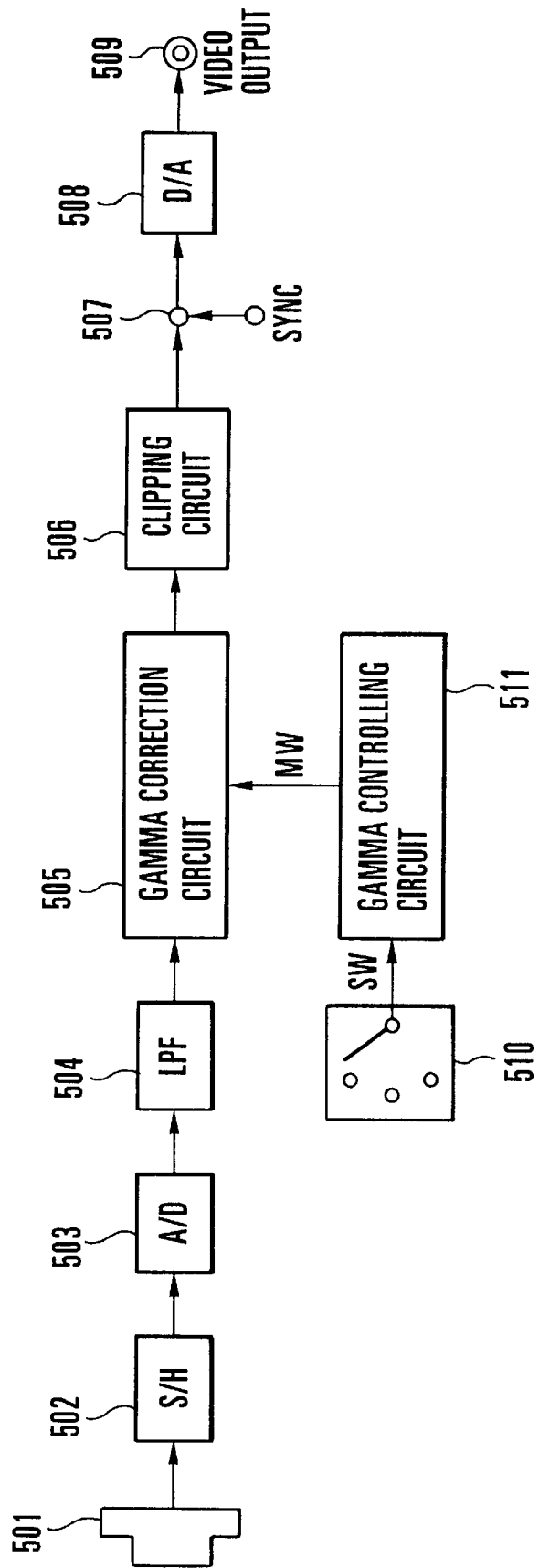
FIG. 15 is a block diagram schematically showing a fourth embodiment of the image pickup apparatus according to the present invention.

FIG. 15 is a functional block diagram schematically showing a fourth embodiment of the image pickup apparatus according to the present invention.

The arrangement shown in FIG. 15 includes a CCD 501 which serves as an image sensor, a sample-and-hold circuit 502 for converting the output signal of the CCD 501 into a continuous signal, an A/D converter 503, a low-pass filter 504 for forming a luminance signal, a gamma correction circuit 505, a clipping circuit 506 for clipping black and white levels, a sync signal adder 507, a D/A converter 508, a video signal output terminal 509, a switch 510 for generating a selecting signal SW for selecting a gamma characteristic, and a gamma controlling circuit 511 for generating a control signal MW for controlling a gamma characteristic, the gamma controlling circuit 511 being made up of a microcomputer and associated elements.

In operation, a subject image (not shown) is formed on the photoelectric conversion surface of the CCD 501 by a photographic optical system (not shown), and is photoelectrically converted into a picked-up image signal. The output signal of the CCD 501 is converted into a continuous signal by the sample-and-hold circuit 502, and the continuous signal is converted into a digital picked-up image signal by the A/D converter 503.

This digital picked-up image signal is converted into a luminance signal by the low-pass filter 504, and the output signal of the low-pass filter 504 is subjected to gamma correction according to the control signal MW for controlling a gamma characteristic which will be described later, in the gamma correction circuit 505. The output signal of the gamma correction circuit 505 is supplied to the clipping circuit 506, in which the levels of the output signal which are lower than a predetermined value or the levels of the output signal which are higher than a predetermined value are clipped. A sync signal is added to the output signal of the clipping circuit 506 by the sync signal adder 507, thereby forming a digital video signal. The digital video signal is converted into an analog video signal by the D/A converter 508. The analog video signal is outputted vie the video signal output terminal 509 to external equipment (not shown) such as a television set or a VTR. The switch 510 generates the selecting signal SW for a gamma characteristic in accordance with a position selected by an operator, and the gamma controlling circuit 511 generates the control signal MW for controlling the gamma characteristic in accordance with the selecting signal SW, whereby the characteristic of the gamma correction circuit 505 is varied as described above.

Figure 16:
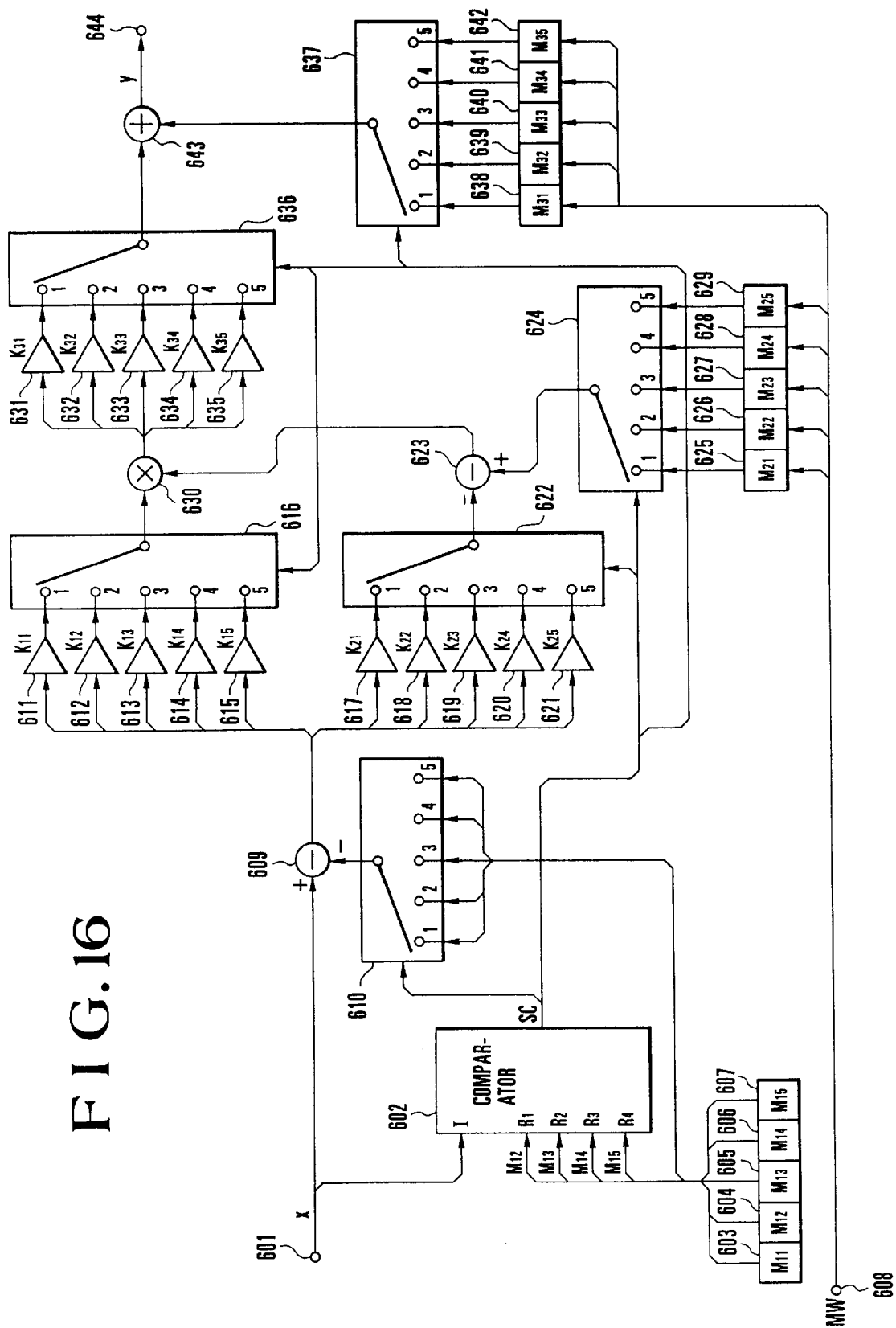
FIG. 16 is a detailed block diagram showing one example of the gamma correction circuit used in the fourth embodiment shown in FIG. 15.

FIG. 16 is a detailed diagram of the gamma correction circuit 505 shown in FIG. 15.

The gamma correction circuit 505 includes a signal input terminal 601, a comparator 602 for comparing an signal input I with reference values inputted to individual reference inputs R1, R2, R3 and R4 and outputting the comparison result, memories 603, 604, 605, 606 and 607 which hold predetermined values M11, M12, M13, M14 and M15, an input terminal 608 for input of the gamma characteristic control signal MW, subtractors 609 and 623, switch circuits 610, 616, 622, 624, 636 and 637, coefficient multipliers 611, 612, 613, 614, 615, 617, 618, 619, 620, 621, 631, 632, 633, 634 and 635 which respectively have coefficients K11, K12, K13, K14, K15, K21, K22, K23, K24, K25, K31, K32, K33, K34 and K35, memories 625, 626, 627, 628, 629, 638, 639, 640, 641 and 642 which respectively hold values M21, M22, M23, M24, M25, M31, M32, M33, M34 and M35 each of which is writable by the control signal MW, a multiplier 630, an adder 643, and a signal output terminal 644.

As described previously, the luminance signal outputted from the low-pass filter 504 is inputted via the signal input terminal 601 as an input signal x. The input signal x is first inputted to the comparator 602. The comparator 602 compares the signal x inputted via the input terminal 601 with each of the values M12, M13, M14 and M15 inputted to the respective reference inputs R1, R2, R3 and R4, and generates a comparison output signal SC. The switch circuits 610, 616, 622, 624, 636 and 637 switch in accordance with the comparison output signal SC. For example, if the input signal I is smaller than the input value M12 at the reference input R1, the comparator 602 generates SC=1, whereby each of the switch circuits 610, 616, 622, 624, 636 and 637 switches to its position "1". If the input signal I is greater than the input value M12 at the reference input R1 and is smaller than the input value M13 at the reference input R2, the comparator 602 generates SC=2, whereby each of the switch circuits 610, 616, 622, 624, 636 and 637 switches to its position "2".

The input signal x is also inputted to the subtractor 609, in which any one value of the predetermined values M11 through M15 which has been selected by the switch circuit 610 in accordance with the signal SC is subtracted from the input signal x. The output signal of the subtractor 609 is first multiplied by the predetermined coefficients K11 through K15 in the respective coefficient multipliers 611 through 615. Any one signal is selected from the output signals of the respective coefficient multipliers 611 through 615 by the switch circuit 616 in accordance with the signal SC. The output signal of the switch circuit 616 is inputted to the multiplier 630. The output signal of the subtractor 609 is also multiplied by the predetermined coefficients K21 through K25 by the respective coefficient multipliers 617 through 621. Any one signal is selected from the output signals of the respective coefficient multipliers 617 through 621 by the switch circuit 622 in accordance with the signal SC. In the subtractor 623, the selected signal is subtracted from any one value which has been selected from the values M21 through M25 held in the respective memories 625 through 629 by the switch circuit 624 in accordance with the signal SC. The signal output of the subtractor 623 is applied to the other input of the multiplier 630.

The multiplier 630 multiplies the signal inputted from the switch circuit 616 by the output signal of the subtractor 623. The output signal of the multiplier 630 is multiplied by the predetermined coefficients K31 through K35 by the respective coefficient multipliers 631 through 635. Any one signal is selected from the output signals of the respective coefficient multipliers 631 through 635 by the switch circuit 636 in accordance with the signal SC. The output signal of the switch circuit 636 is, in the adder 643, added to any one value which has been selected from the values M31 through M35 held in the respective memories 638 through 642 by the switch circuit 637 in accordance with the signal SC. The output signal of the adder 643 is inputted via the output terminal 644 to the clipping circuit 506 as described below.

In the meantime, when the gamma characteristic control signal MW is inputted via the input terminal 608 for input of the gamma characteristic control signal MW, the values held in the respective memories 625, 626, 627, 628, 629, 638, 639, 640, 641 and 642 are rewritten according to the value of the gamma characteristic control signal MW.

FIGS. 17(a), 17(b) and 17(c) are explanatory views of the operation of the gamma correction circuit 505 shown in FIG. 15, which is used in the fourth embodiment of the present invention.

FIG. 17(a) shows the input-output characteristic of the gamma correction circuit 505. As shown in FIG. 17(a), the input-output characteristic consists of a combination of five curves A to E on the basis of the values M12 to M15 held in the respective memories 604 to 607 shown in FIG. 16. For each of the intervals, the signal SC takes any one value from the values of 1 to 5 in the above-described manner. The switch circuits 610, 616, 622, 624, 636 and 637 perform switching according to the value of the signal SC, whereby the characteristics of the respective curves vary. If the characteristic of an n-th curve is denoted by yn(x), computation performed by the gamma correction circuit 505 show in FIG. 16 is represented as the quadratic equation:

$$yn(x)=[(x-M1n)*K1n*[-(x-M1n)*K2n)]*K3n+M3n \quad (1)$$

In Equation 1, n represents the value of the signal SC. By differentiating this equation, the following equations are obtained:

$$yn'(x)=K1n*M2n*K3n-2*(x-M1n)*K1n*K2n*K3n \quad (2)$$

For x=M1n, $$yn(M1n)=M3n \quad (3)$$

$$yn'(M1n)=K1n*M2n*K3n \quad (4)$$

For x=M1(n+1), $$yn(M1(n+1))=[(M1(n+1)-M1n)*K1n*(-(M1(n+1)-M1n)*K2n+M2n)]*K3n+M3n \quad (5)$$

$$yn'(x)=K1n*M2n*K3n-2*(M1(n+1)-M1n)*K1n*K2n*K3n \quad (6)$$

In the gamma correction characteristic shown in FIG. 17(a), to prevent occurrence of a degradation in image quality, the n-th curve and the (n+1)-th curve must be smoothly joined together. The conditions required to realize such smooth connection at the connection part x=M1(n+1) are as follows:

$$yn(M1(n+1))=yn+1(M1(n+1)) \quad (7)$$

$$y'n(M1(n+1))=y'n+1(M1(n+1)) \quad (8)$$

These conditions are shown in FIG. 17(b).

To satisfy the conditions, the following equations are obtained from Equations 3, 4, 5 and 6:

$$[(M1(n+1)-M1n)*K1n*(-(M1(n+1)-M1n)+K2n+M2n)]*K3n+M3n=M3(n+1) \quad (9)$$

$$K1n*M2n*K3n-2*(M1(n+1)-M1n)*K1n*K2n*K3n =k1(n+1)*M2(n+1)*K3(n+1) \quad (10)$$

From Equations 9 and 10, it can be seen that a curve yn+1(x) which smoothly joins to an arbitrary curve yn(x) can be obtained by varying only M2(n+1) and M3(n+1) in the computational processing of FIG. 16.

FIG. 17(c) shows input-output characteristics obtainable when the gamma correction characteristic is made variable. In general, if the gamma correction characteristic is made variable, the characteristic of an input signal in the neighborhood of 0 becomes most important. If the effect of gamma correction is to be reduced, the gain in the neighborhood of 0 is made closer to 1, whereas if the effect of gamma correction is to be increased, the gain in the neighborhood of 0 is increased. In FIG. 17(c), (1) denotes a curve which is obtained when the effect of gamma correction is made greater than a standard level, (2) denotes a standard curve, and (3) denotes a curve which is obtained when the effect of gamma correction is made smaller than the standard level. G1, G2 and G3 denote the inclinations of the respective curves (1), (2) and (3) in the neighborhood of 0 and satisfy the condition of G1>G2>G3.

The aforementioned M21 to M25 and M31 to M35 for each of the curves can be determined in the following manner.

To determine, for example, the curve (1), M21 and M31 are first found from Equations 3 and 4:

$$M31=0 \quad (11)$$

$$M21=G1/K11/K31 \quad (12)$$

These M21 and M31 are respectively employed to find sequentially M22 to M25 and M32 to M35 from Equations 9 and 10, whereby the value of each of the memories for the characteristic of the curve (1) can be obtained. In this case, even if the left and right sides of each of Equations 9 and 10 do not completely coincide, there is no substantial problem as far as the amount of discrepancy therebetween is within a visually allowable range. For example, in the case of Equation 9, if an error is not greater than approximately 0.4% of a gamma-corrected output signal, there is no substantial problem in visual terms. In the case of Equation 10, because of its slightly wider allowable range, there is no problem as far as an error is not greater than approximately 10% of a gamma-corrected output signal. Accordingly, it suffices to find the respective values of the memories while taking such errors into account, so as to cause a gamma correction characteristic to coincide with an appropriate characteristic as accurately as possible.

The thus-obtained values are written into a ROM incorporated in the gamma controlling circuit 511. The above-described gamma correction characteristic can be obtained by writing the values into each of the memories in accordance with the selecting signal SW outputted from the switch 510.

Figure 18:
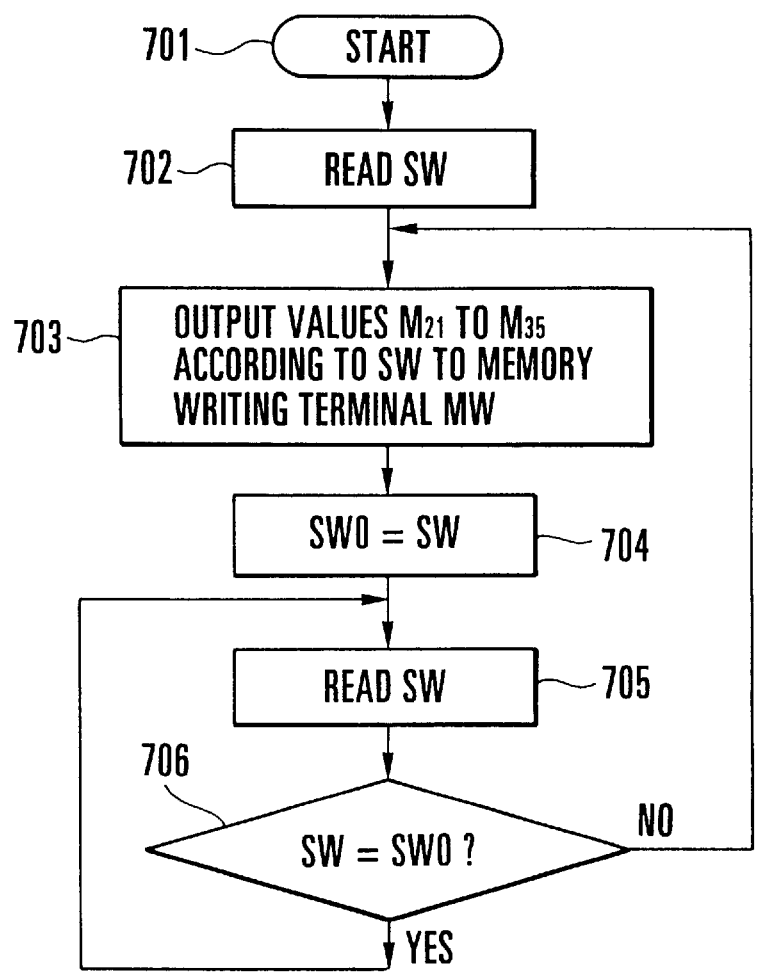
FIG. 18 is a flowchart showing the operation of gamma control executed in the fourth embodiment.

FIG. 18 is a flowchart showing the operation of gamma controlling circuit 511 which is formed by, for example, a microcomputer.

The flow starts in Step 701, and a selecting signal SW is read in Step 702. In Step 703, the values M21 to M35 according to the read SW are found through the computations of Equations 11, 12, 9 and 10 by using a gain G close to 0 according to SW, or calculated values, which are beforehand written in a ROM incorporated in the microcomputer, are read out according to SW and the read values are outputted as a gamma characteristic control signal MW. The thus-obtained values M21 to M35 are written into the memories 625 to 629 and 638 to 642 in the previously-described manner. Then, in Step 704, SW0=SW is set and, in Step 705, SW is again read. In Step 708, SW is compared with SW0. If SW=SW0, the process returns to Step 705, and Steps 705 and 706 are again executed. If it is determined in Step 706 that SW is not equal to SW0, the process returns to Step 703, in which the values M21 to M35 are found according to SW, which was again read in Step 705, and outputted as MW. Then, Step 704 and the following steps are executed.

Figure 19:
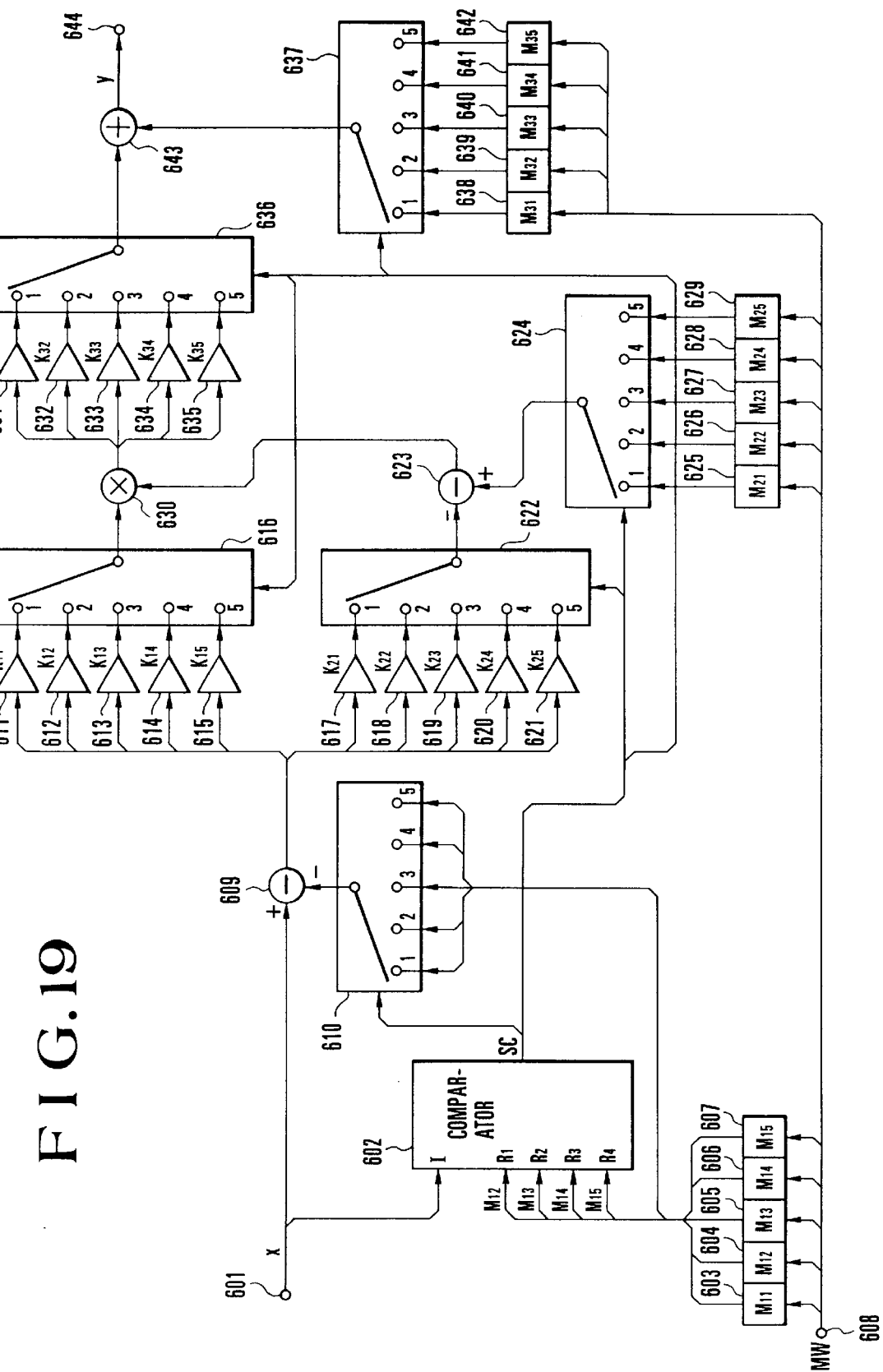
FIG. 19 is a detailed block diagram showing another example of the gamma correction circuit.

FIG. 19 is a detailed diagram of a second example of the gamma correction circuit 505. In FIG. 19, the same reference numerals are used to denote portions identical to or equivalent to those shown in FIG. 16. An input signal is processed in a manner similar to that described above with reference to FIG. 16, whereby a gamma-corrected output signal y is formed. Also, values according to a gamma correction control signal MW which is inputted through the input terminal 608 are respectively written into and held in the memories 603 to 607, 625 to 629 and 638 to 642. Accordingly it is possible to vary the values M11 to M15 in addition to the values which are variable in the example shown in FIG. 16. With this arrangement, it is possible to widen the range of variation of a gamma correction characteristic to a further extent. In the arrangement shown in FIG. 16, if the M gamma correction characteristic is greatly varied with M11 to M15 fixed, the required characteristic may not be obtained or the multiplier 630 may overflow. For this reason, the example shown in FIG. 19 is arranged in such a manner that the values M11 to M15 can vary with SW.

In the above-described fourth embodiment, since the coefficient multipliers 611 to 615, 617 to 621 and 631 to 635 are inserted to prevent the multiplier 630 from overflowing, the values of the respective coefficient multipliers may be arranged in the form of two to the n-th power, such as "1", "2", "3", "4" or "8", or in the form of a combination of approximately two or three numbers selected from these numbers. Accordingly, an extremely simple arrangement can be adopted. Further, in this arrangement, since it is possible to effectively utilize the dynamic range of the multiplier 630 having a large circuit scale, it is possible to reduce the number of input and output bits of the multiplier 630 and hence the circuit scale thereof. Accordingly, it is possible to prevent the multiplier 630 from producing an error due to a cancellation of significant digits. If another arrangement including a multiplier having a fully large dynamic range is adopted, part or the whole of the coefficient multipliers shown in FIG. 16 or 19 can be omitted.

Although FIGS. 17(a), 17(b) and 17(c) show the gamma correction characteristic corresponding to the 0 to 100% range of an input, a characteristic corresponding to 100% or more of an input, which is called knee characteristic, can be similarly realized. In this case, it is possible to adopt an arrangement in which the knee characteristic is varied according to SW on the basis of the settings of the values M11 to M35 of the respective memories, or it is also possible to adopt an arrangement in which the knee characteristic does not greatly vary even if SW is varied.

The above-described fourth embodiment is arranged in such a manner that the gamma correction characteristic is formed by the five curves. However, this arrangement is not to be construed as a limiting example. For example, it is possible to adopt an arrangement in which the gamma correction characteristic is formed by switching two or more arbitrary curves.

The above-described fourth embodiment is also arranged in such a manner that values are written into the memories 603 to 607, 625 to 629 and 638 to 642 in accordance with the gamma characteristic control signal MW. However, it is also possible to adopt an arrangement which has memories in which a plurality of predetermined values are beforehand written. In this arrangement, any one selected from the predetermined values is outputted from each of the memories in accordance with the gamma characteristic control signal MW.

Although in the above-described fourth embodiment the function expressed as Equation 1 is realized as a gamma curve, this function is not to be construed as a limiting example. For example, various functions having different characteristic curves of upward convex form may be prepared, and a gamma curve may be formed by switching the various functions. In this case, by varying constants in the functions so that Equations 7 and 8 can be valid at the connection points of the functions, it is possible to realize a gamma correction circuit of variable characteristic according to the present invention.

Figure 20:
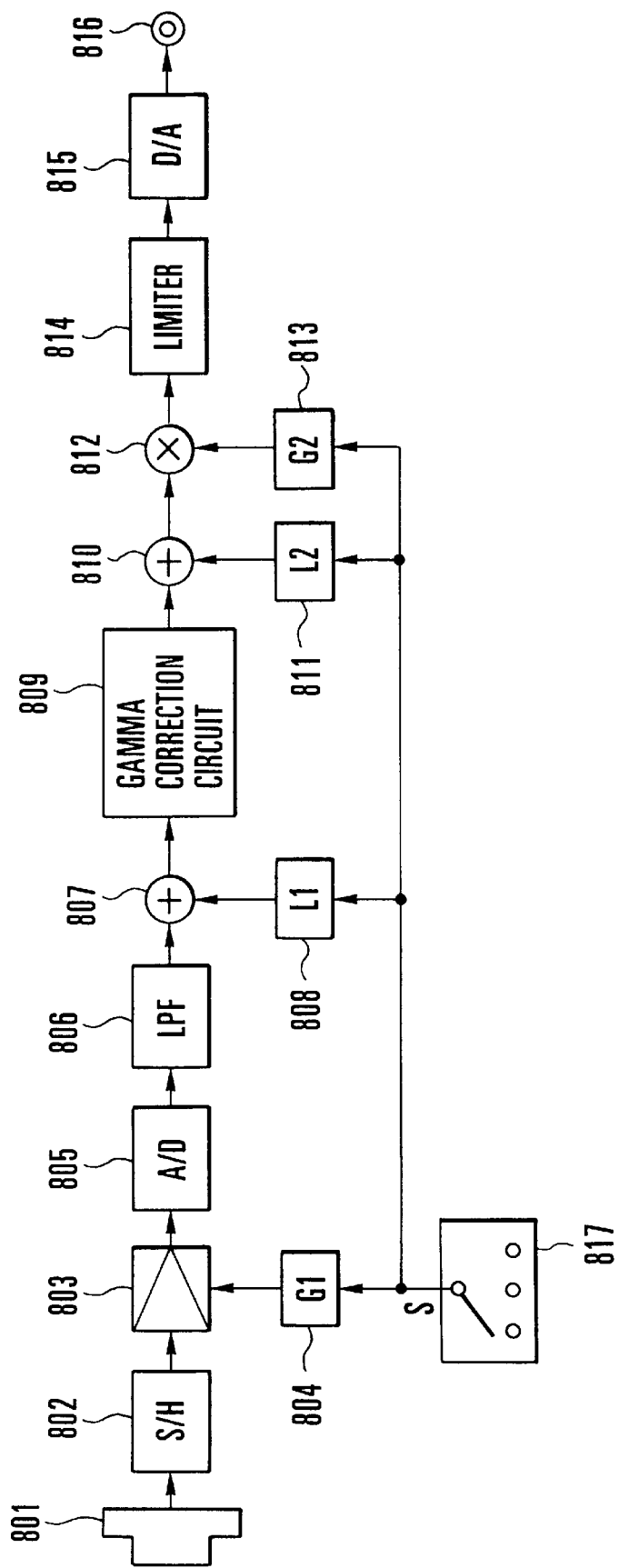
FIG. 20 is a block diagram schematically showing a fifth embodiment of the image pickup apparatus according to the present invention.

FIG. 20 is a block diagram schematically showing a fifth embodiment of the present invention.

The arrangement shown in FIG. 20 includes a CCD 801 which serves a s an image sensor, a sample-and-hold circuit 802 for converting the output signal of the CCD 801 into a continuous signal, an amplifier 803 the gain of which can be varied in accordance with a gain variation control input, a memory 804 for memorizing a gain control value G1, an A/D converter 805, a low-pass filter 806 for forming a luminance signal, an adder 807, a memory 808 for holding a value L1, a gamma correction circuit 809, an adder 810, a memory 811 for holding a value L2, a multiplier 812, a memory 813 for holding a value G2, a limiter 814 for limiting a black level and a white level, a D/A converter 815, a television signal output terminal 816, and a switch 817 for generating a memory control signal S for controlling the values of the respective memories 804, 808, 811 and 813.

In operation, a subject image (not shown) is formed on the image sensing surface of the CCD 801 and photoelectrically converted into a picked-up image signal. The picked-up image signal outputted from the CCD 801 is converted into a continuous signal by the sample-and-hold circuit 802. The output signal of the sample-and-hold circuit 802 is amplified by the amplifier 803 by using a gain according to the value G1 held in the memory 804. The output signal of the amplifier 803 is converted into a digital picked-up image signal by the A/D converter 805.

This digital picked-up image signal is converted into a luminance signal by the low-pass filter 806, and the output luminance signal of the low-pass filter 806 is applied to the adder 807. In the adder 807, the value L1 held in the memory 808 is added to the luminance signal. The output signal of the adder 807 is subjected to gamma correction in the gamma correction circuit 809, and the output signal of the gamma correction circuit 809 is applied to the adder 810. In the adder 810, the value L2 held in the memory 811 is added to the applied signal, and in the multiplier 812 the output signal of the adder 810 is multiplied by the value G2 held in the memory 813. The output signal of the multiplier 812 is supplied to the limiter 814, in which the levels of the output signal which are lower than a predetermined value or the levels of the output signal which are higher than a predetermined value are limited. The output signal of the limiter 814 is converted from digital to analog by the D/A converter 815, and the analog video signal is outputted via the output terminal 816 to external equipment (not shown) such as a television set or a VTR. The switch 817 generates the memory control signal S in accordance with a position selected by an operator, thereby controlling th e memories 804, 808, 811 and 813 to vary the respective values held in them. By varying the respective values of the memories 804, 808, 811 and 813, the gamma correction characteristic can be varied through the overall processing performed in the entire apparatus as will be described later.

Each of the memories 804, 808, 811 and 813 may be formed by a ROM in which predetermined values are written, and any one selected from the predetermined values may be outputted from each of the memories 804, 808, 811 and 813 in accordance with the memory control signal S. Otherwise, each of the memories 804, 808, 811 and 813 may be formed by a RAM, and any one selected from the values memorized in another memory may be written into each of the memories 804, 808, 811 and 813 in accordance with the memory control signal S.

The gamma correction characteristic can be varied far more finely or continuously. To realize this operation, it is only necessary to construct the switch 817 of a potentiometer or an up-down switch and an up-down counter. The operator can operate the switch 817 to adjust the gamma correction characteristic to the desired characteristic.

Figure 21A:
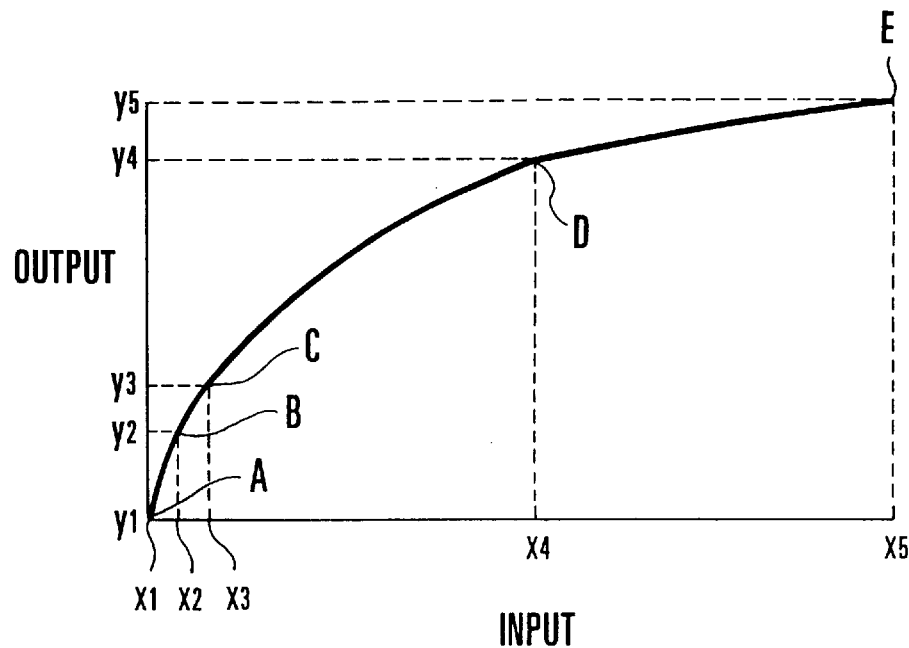
FIGS. 21(*a*) and 21(*b*) are explanatory views showing the operation of the fifth embodiment shown in FIG. 20.
Figure 21B:
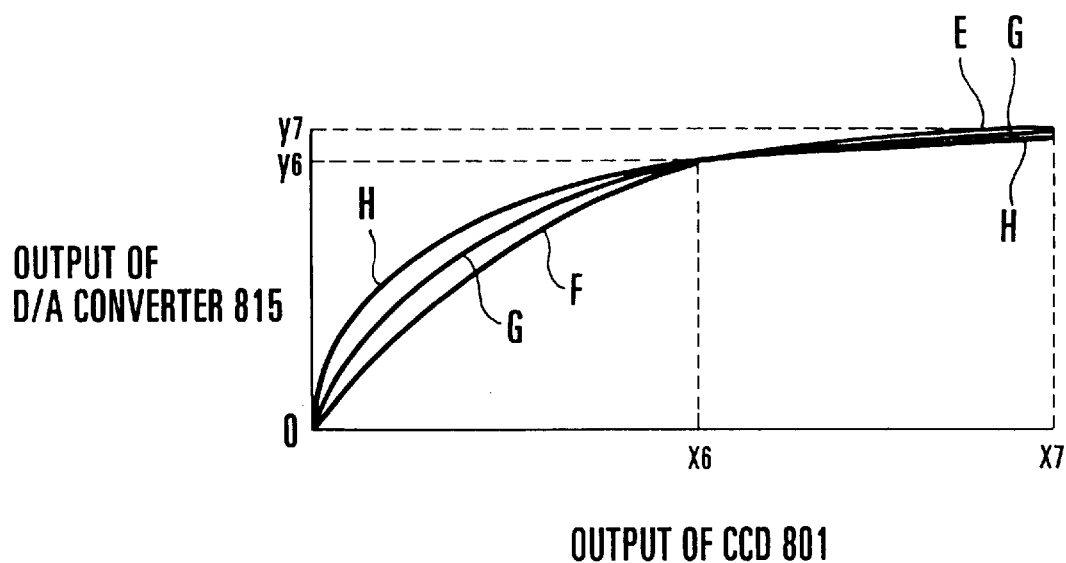

FIGS. 21(a) and 21(b) are explanatory views of the operation of the fifth embodiment.

FIG. 21(a) shows the input-output characteristic of the gamma correction circuit 809, The characteristic of the gamma correction circuit 809 is set so that, by using a part B-D, it is possible to obtain a gamma correction characteristic which is in a normal state. Also, by using a part A-D, it is possible to obtain a gamma correction characteristic which provides a larger amount of gamma correction than in the normal state: That is to say the gain in the neighborhood of a black level is higher than in the normal state, while the gain in the neighborhood of a white level is lower than in the normal state. Also, by using a part C-D, it is possible to obtain a gamma correction characteristic which provides a smaller amount of gamma correction than in the normal state: That is to say the gain in the neighborhood of a black level is lower than in the normal state, while the gain in the neighborhood of a white level is higher than in the normal state. Also, a part D-E constitutes a knee characteristic which is a compression characteristic for a high luminance level.

If the gamma correction characteristic in the normal state is to be obtained, the gain control value G1 is set to a value which provides a gain K1 which enables ((100% white level)−(black level)) at the output terminal of the CCD 801 to become (x4−x2) at the input of the gamma correction circuit 809. Further, the value Li is set to x2, the value L2 is set to −y2, and the value G2 is set to a value which enables (y4−y2) to become ((100% white level)−(black level)) at the output terminal 816. In this arrangement, the black level of the output signal of the CCD 801 passes through the point (x2, y2) shown in FIG. 21(a) and constitutes the black level at the output terminal 816, whereas the 100% white level of the output signal of the CCD 801 passes through the point (x4, y4) shown in FIG. 21(a) and constitutes the 100% white level at the output terminal 816. Accordingly, as described above, by using the characteristic of the part B-D, it is possible to obtain the gamma correction characteristic which is in the normal state.

If the gamma correction characteristic which provides a larger amount of gamma correction than in the normal state is to be obtained, the gain control value G1 is set to a value which provides a gain K2 which enables ((100% white level)−(black level)) at the output terminal of the CCD 801 to become (x4−x1) at the input of the gamma correction circuit 809. Further, the value L1is set to x1, the value L2 is set to −y1, and the value G2 is set to a value which enables (y4−y1) to become ((100% white level) (black level)) at the output terminal 816. In this arrangement, the black level of the output signal of the CCD 801 passes through the point (x1, y1) shown in FIG. 21(a) and constitutes the black level at the output terminal 816, whereas the 100% white level of the output signal of the CCD 801 passes through the point (x4, y4)shown in FIG. 21(a) and constitutes the 100% white level at the output terminal 816. Accordingly, as described above, by using the characteristic of the part A-D, it is possible to obtain the gamma correction characteristic which provides a larger amount of gamma correction than in the normal state.

If the gamma correction characteristic which provides a smaller amount of gamma correction than in the normal state is to be obtained, the gain control value G1 is set to a value which provides a gain K3 which enables ((100% white level)−(black level)) at the output terminal of the CCD 801 to become (x4−x3) at the input of the gamma correction circuit 809. Further, the value L1 is set to x3, the value L2 is set to −y3, and the value G2 is set to a value which enables (y4−y3) to become ((100% white level)−(black level)) at the output terminal 816. In this arrangement, the black level of the output signal of the CCD 801 passes through the point (x3, y3) shown in FIG. 21(a) and constitutes the black level at the output terminal 816, whereas the 100% white level of the output signal of the CCD 801 passes through the point (x4, y4) shown in FIG. 21(a) and constitutes the 100% white level at the output terminal 816. Accordingly, as described above, by using the characteristic of the part C-D, it is possible to obtain the gamma correction characteristic which provides a smaller amount of gamma correction than in the normal state.

In general, in FIG. 21(a), if x represents the black level of an input signal, as x becomes larger, the amount of gamma correction becomes smaller, while as x becomes smaller, the amount of gamma correction becomes larger. To determine the values L1, L2 and G2 and the value of the gain K of the amplifier 803 with respect to a specific x, the following equations are employed:

$$K=g1*(x4-x)/(x4-x2)$$

$$L1=x$$

$$L2=-f(x)$$

$$G2=(f(x4)-f(x2))/(f(x4)-f(x))*g2$$

where the function f(x) represents the input-output characteristic of the gamma correction circuit 809, x2 represents the black level of the input signal which is in a standard state, x4 represents the 100% white level of the input signal which is in the standard state, and g2 represents the value of G2. It is assumed here that the gain of the amplifier 803 at this time is set to K1.

Accordingly, to vary the gamma correction characteristic continuously in the above-described manner, it is only necessary to vary the values of K, L1, L2 and G2 while using x as a parameter in accordance with the above equations.

FIG. 21(b) shows the gamma correction characteristics obtained through the above-described overall processing performed in the entire apparatus. The horizontal axis represents the output of the CCD 801, while the vertical axis represents the output of the D/A converter 815. In FIG. 21(b), the curve F indicates the gamma correction characteristic which provides the smaller amount of correction than in the normal state, the curve G indicates the gamma correction characteristic which is in the normal state, and the curve H indicates the gamma correction characteristic which provides the larger amount of correction than in the normal state. x6 indicates the output value of the CCD 801 at the 100% white level, and x7 indicates the output value of the CCD 801 at the saturation level thereof. As described above, in the part between x6 and x7, each of the characteristic curves takes the form of the knee characteristic. As can be seen from FIG. 21(b), the gamma characteristic in the range between the black level and the 100% white level can be varied by varying the values of G1, L1, L2 and G2, whereas the knee characteristic part in the range above the 100% white level does not substantially vary even if the gamma characteristic is varied.

In the output range of the gamma correction circuit 809, an actually usable range may occasionally become narrow as shown in FIG. 21(a). This characteristic degradation due to a cancellation of significant bits occurring during gamma correction can be suppressed by preparing the gamma correction circuit 809 which is arranged to provide an output having a resolution of (n+a) bits ("n" represents the number of unit bits which are used for conversion performed by the D/A converter 815 and "a" is approximately 1–3). As can be seen from FIG. 21(*a*), if a signal of level lower than a black level enters the gamma correction circuit 809 owing to noise or the like, a signal whose level is lower than the black level may be outputted from the apparatus. In the opposite case, an excessively large output may be produced. The limiter 814 is provided for preventing occurrence of such a problem.

The multiplier 812 and the memory 813 can also be used for other purposes. For example, they can be used for adjusting a signal level or effecting the fade function of varying a signal with time.

The amplifier 803 can also be used in combination with an automatic gain control amplifier arranged to raise the gain of the amplifier 803 when a subject of low illuminance is photographed. In this case, it is also possible to adopt an arrangement in which the gain of the amplifier 803 can be varied by inputting the output signal of the memory 804 to a reference voltage terminal of the automatic gain control amplifier.

The above-described embodiment is arranged so that its non-linear correction characteristic can be set to either a correction characteristic which provides a larger amount of correction than a normal-state correction characteristic or a correction characteristic which provides a smaller amount of correction than the normal-state correction characteristic. However, the present invention is not limited to this arrangement, and it is also possible to adopt an arrangement in which the non-linear correction characteristic can be set to either one of the former and latter correction characteristics. Although the above description has referred to the non-linear circuit having the gamma and knee characteristics, the present invention can of course be applied to a non-linear circuit having a non-linear correction characteristic other than the gamma and knee characteristics.

As is apparent from the foregoing description, in accordance with the embodiments of the present invention, since it is possible to realize a non-linear circuit without using a ROM, it is possible to implement a non-linear circuit having a reduced circuit scale. Accordingly, it is possible to achieve highly effectively a cost reduction, a reduction in the power consumption of the apparatus and a reduction in the entire size of the apparatus.

Also, since the value and inclination of each function coincide with those of the adjacent function at each function switching point, it is possible to realize the advantage of preventing image degradation from occurring due to the switching of the functions.

Further, since the number of bits at the input of the multiplier may be smaller than the number of bits of an input signal, the circuit scale can be greatly reduced.

Also, since it is possible to form the circuit as an integrated circuit of reduced chip size, a reduction in manufacturing cost can be achieved. Also, since a non-linear characteristic, such as a gamma characteristic or a knee characteristic, can be finely varied according to the conditions of a subject or the state of photography it is possible to perform photography in an optimum state at all times. Further, since a gamma characteristic and a knee characteristic can be realized by a single circuit, the required circuit scale can be reduced.

In accordance with the above-described embodiments of the present invention, it is possible to vary a non-linear correction characteristic by means of a simple arrangement, so that the non-linear correction characteristic can be varied according to the state of photography or the condition of a subject to be photographed. Among others, it is possible to vary the non-linear correction characteristic over a wide range by varying constants for use in addition and subtraction without varying a coefficient term, and, in addition, no ROM table is needed and only one multiplier having a large circuit scale is used. Accordingly it is possible to achieve a large variation effect without an increase in circuit scale.

Further, in accordance with the above-described embodiments of the present invention, since a gamma characteristic can be varied without substantially varying a knee characteristic, no dynamic range is impaired.

What is claimed is:

1. An image pickup apparatus arranged to convert a picked-up image signal from analog to digital and perform signal processing in a digital manner, comprising a gamma circuit having a gamma region in which a gamma characteristic is obtained by adding together a straight line passing through an origin and a first curve and a knee region in which a knee characteristic is obtained by adding together a predetermined value and a second curve.

2. An image pickup apparatus according to claim 1, wherein the first curve is obtained by multiplying a third curve by a first coefficient and the second curve is obtained by multiplying a fourth curve by a second coefficient, each of the first coefficient and the second coefficient being variable.

3. An image pickup apparatus according to claim 2, wherein the third curve is formed by not less than one quadratic function and the fourth curve is a straight line, the third curve and the fourth curve being each obtained by varying a coefficient of one function circuit including a multiplier in accordance with an input level.

* * * * *

UNITED STATES PATENT AND TRADEMARK OFFICE
CERTIFICATE OF CORRECTION

PATENT NO. : 5,818,521
DATED : October 6, 1998
INVENTOR(S) : Teruo Hieda

It is certified that error appears in the above-identified patent and that said Letters Patent is hereby corrected as shown below:

Cover page [57], ABSTRACT, line 9, after "$n_1$" (second occurrence), delete ",".

Column 3, line 54, after "an", delete "-".

Column 8, line 49, delete "$S_d$" and insert --$S_D$--.

Column 9, line 2, delete "$Y_1$ and $Y_2$" and insert --$y_1$ and $y_2$--.

Column 9, line 17, delete "$C_2=e_3$" and insert --$c_2=e_3$--.

Column 9, line 61, delete "$C_3$" and insert --$c_3$--.

Column 12, line 29, delete "$C_3$" and insert --$c_3$--.

Column 12, line 34, delete "$X_3$" and insert --$x_3$--.

Column 12, line 38, delete "$X_3 \leqq X < X < X_1$" and insert --$x_3 \leqq X < x_1$--.

UNITED STATES PATENT AND TRADEMARK OFFICE
CERTIFICATE OF CORRECTION

PATENT NO. : 5,818,521
DATED : October 6, 1998
INVENTOR(S) : Teruo Hieda

It is certified that error appears in the above-identified patent and that said Letters Patent is hereby corrected as shown below:

Column 12, line 45, delete "X$_3$" and insert --x$_3$--.

Column 13, line 36, delete "vie" and insert --via--.

Column 18, line 2, delete "a s" and insert --as--.

Column 18, line 41, delete "DIA" and insert --D/A--.

Column 18, line 46, delete "th e" and insert --the--.

Signed and Sealed this

Sixth Day of July, 1999

Attest:

Q. TODD DICKINSON

Attesting Officer     Acting Commissioner of Patents and Trademarks